(12) United States Patent
Oki

(10) Patent No.: US 7,760,370 B2
(45) Date of Patent: Jul. 20, 2010

(54) IMAGE FORMING APPARATUS, INFORMATION PROCESSING APPARATUS, IMAGE FORMING SYSTEM, IMAGE POSITION CORRECTING METHOD, RECORDING MEDIA, AND PROGRAM

(75) Inventor: Makoto Oki, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1267 days.

(21) Appl. No.: 11/058,160

(22) Filed: Feb. 16, 2005

(65) Prior Publication Data

US 2005/0286922 A1 Dec. 29, 2005

(30) Foreign Application Priority Data

Jun. 29, 2004 (JP) ............................. 2004-191806

(51) Int. Cl.
*G06F 3/12* (2006.01)
*G06K 15/00* (2006.01)
*H04N 1/46* (2006.01)
*G03G 15/00* (2006.01)

(52) U.S. Cl. ........................ 358/1.1; 358/1.12; 358/504; 358/505; 399/75

(58) Field of Classification Search ................. 358/1.12, 358/1.1, 406, 474, 504, 505; 399/75, 376, 399/407

See application file for complete search history.

(56) References Cited

U.S. PATENT DOCUMENTS

| | | | |
|---|---|---|---|
| 5,905,935 A * | 5/1999 | Wakamatsu et al. ......... | 399/407 |
| 6,226,419 B1 * | 5/2001 | Lodwick et al. ............. | 382/294 |
| 6,954,277 B2 * | 10/2005 | Kamata et al. ............. | 358/1.12 |
| 2002/0110380 A1 | 8/2002 | McIntyre | |
| 2003/0133000 A1 | 7/2003 | Conrow et al. | |
| 2003/0169921 A1 * | 9/2003 | Yamamoto ................. | 382/170 |
| 2004/0184853 A1 * | 9/2004 | Matsuzaka et al. ......... | 399/394 |

(Continued)

FOREIGN PATENT DOCUMENTS

EP 1 292 115 A2 3/2003

(Continued)

OTHER PUBLICATIONS

European Search Report dated Feb. 27, 2007.

(Continued)

*Primary Examiner*—Mark K Zimmerman
*Assistant Examiner*—Fan Zhang
(74) *Attorney, Agent, or Firm*—Finnegan, Henderson, Farabow, Garrett & Dunner, L.L.P.

(57) ABSTRACT

In one embodiment, an image forming apparatus: forms, on both sides of a reference chart sheet 10, reference positioning images which are determined in advance relative to reference positions on both sides of the reference chart sheet 10; reads reference images through the image readable area from a plurality of parts on both sides of the reference chart sheet 10 or from the folded reference chart sheet 10; and adjusts image forming positions on both sides of a paper according to read-out information obtained from the reference images. The image forming positions are corrected on both sides of the paper which is greater in size than the image readable area of the image reader 11 by reading the images from multiple parts of the reference chart sheet 10 or from the folded reference chart sheet 10.

11 Claims, 17 Drawing Sheets

U.S. PATENT DOCUMENTS

2004/0240894 A1 * 12/2004 Tomita et al. .................. 399/17
2005/0219590 A1 * 10/2005 Andersen et al. ........... 358/1.12
2005/0244603 A1 * 11/2005 Hodsdon et al. ........... 428/40.1

FOREIGN PATENT DOCUMENTS

| JP | H5-122501 | 5/1993 |
| JP | 07283933 A * | 10/1995 |
| JP | H7-283933 | 10/1995 |
| JP | 2000-127549 | 5/2000 |
| JP | 2000-137595 | 5/2000 |
| JP | 2003-173109 | 6/2003 |
| JP | 2004-15421 | 1/2004 |
| JP | 2004-15738 | 1/2004 |

OTHER PUBLICATIONS

JPO Office Action, Dated Mar. 17, 2009, for Foreign Counterpart Application No. 2004-191806. 5 pages.

* cited by examiner

AN EXAMPLE OF CONFIGURATION OF A DIGITAL COPYING MACHINE 100

AN EXAMPLE OF FORMATION OF A REFERENCE CHART 10

AN EXAMPLE OF FORMATION OF MARK IMAGES m(1) TO m(4)
ON BOTH SIDES OF A REFERENCE CHART 10

FRONT SIDE OF PAPER

BACK SIDE OF PAPER

AN EXAMPLE OF DISPOSITION OF A CONTROL PATTERN SHEET P1
WHICH IS GREATER THAN THE IMAGE READABLE AREA I

AN EXAMPLE OF COMBINATION OF IMAGE DATA Din1 AND Din2
READ FROM THE CONTROL PATTERN P1
FIG. 7 (A)         FIG. 7 (B)
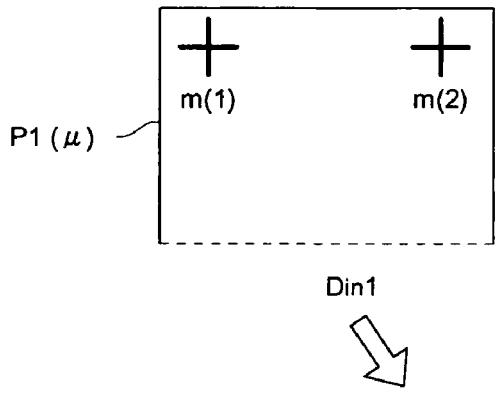
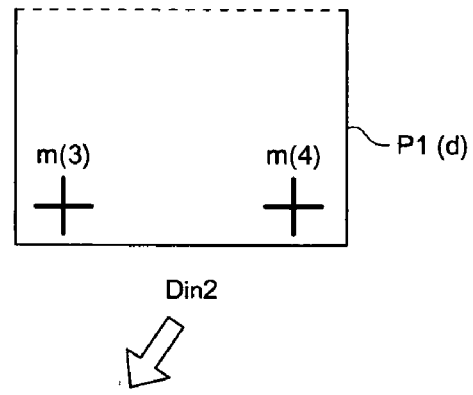
COMBINED
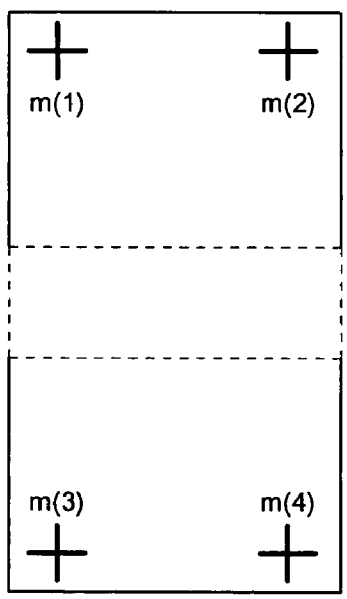
$P1 = P1(\mu) + P1(d)$
$Din = Din1 + Din2$
FIG. 7 (C)

AN EXAMPLE OF IMAGE PROCESSING OF THE COPYING MACHINE 100

AN EXAMPLE OF SCANNING BOTH SIDES

AN EXAMPLE OF FORMATION OF A CONTROL PATTERN P2
WHICH IS THE SECOND EMBODIMENT OF THIS INVENTION

AN EXAMPLE OF FORMATION OF MARKS Mf AND Mb TO JUDGE PAPER SIDES

AN EXAMPLE OF IMAGE PROCESSING FLOW (II) WHEN THE COPYING MACHINE 100 HANDLES THE CONTROL PATTERN P2

AN EXAMPLE OF FORMATION OF A REFERENCE CHART 10' WHICH IS RELATED TO THE THIRD EMBODIMENT OF THIS INVENTION

IMAGE FORMING APPARATUS, INFORMATION PROCESSING APPARATUS, IMAGE FORMING SYSTEM, IMAGE POSITION CORRECTING METHOD, RECORDING MEDIA, AND PROGRAM

BACKGROUND OF THE INVENTION

1. Field of the Invention

The present invention relates to an image forming apparatus, information processing apparatus, image forming system, image position correcting method, recording media, and a computer-readable program that are applicable to a network image forming system having a function of reading images from documents and reproducing them on both sides of paper.

2. Description of Related Art

Recently, it has become very common to use monochromatic and color printers, copiers, and multi-function peripherals (MFPs) that form images from arbitrary image information. For example, a monochromatic digital copying machine has a scanner and an image forming section consisting of an exposing section, a developer, a photosensitive drum, and a fixing section.

A document is read by a scanner and its image is turned into binary data, or image information. The exposing section draws an electrostatic latent image on the photosensitive drum according to the image information after image processing. The developer applies black toner to the electrostatic latent image on the photosensitive drum to make it visible. The developed toner image is transferred from the photosensitive drum to a piece of paper and fixed to the paper by the fixing section. With this, an image can be formed on the paper fed from the paper tray.

It has also become very common to use copiers, printers, and MFPs that duplicate document images on both sides of paper (Double-Side Copy mode). The Double-Side Copy mode enables preparation of a cover for a hand-made booklet or the like. For example, an A3-Wide size paper is often used as a cover for a booklet made of A4 size paper sheets. A two-folded A3-Wide size paper sheet is slightly larger than an A4-size paper sheet. In the Double-Side Copy mode, the page position on one side of an A4-size paper sheet must be matched with the page position on the other side of the paper sheet for assurance of image formation quality.

Usually, such copiers, printers and MFPs are designed to form images at the same position on both sides of each piece of paper. In some cases, however, the printed images may not be at the expected positions on both sides of the paper because of heat shrinkage of paper and so on. To alleviate such displacement of images on both sides of paper, conventional printing and copying machines have employed a method of manually measuring the image displacement using rulers or the like, calculating a value to eliminate the displacement, and manually entering the value into the machine.

One conventional image forming apparatus writes positioning marks on both sides of paper, reads the mark on one side of the paper together with the mark on the other side of the paper through the paper using its scanner. Its information processor processes image data of these marks and detects a positional difference between them. The configuration of this image forming apparatus can remove or alleviate not only a positional difference between images on both sides of paper but also a magnification difference between them due to shrinkage and expansion of paper and can match the image forming positions on both sides of paper. One such apparatus is described, for example, in Japanese Non-examined Patent Publication 2003-173109 (e.g., Page 6, FIG. 1).

Recently, users of image forming apparatus such as copying machines with a double-side copying function have wanted to attach covers to hand-made booklets and leaflets. This leads to formation of images greater in size than the image readable area (or the maximum scan size) of the scanner of the image forming apparatus.

For example, an image forming apparatus such as a copier with a maximum scan size of A-3 may be requested to form images on A3-Wide size paper. However, it has been hard to correct the positional difference between positioning marks on both sides of the paper when the positioning marks are outside the image reading area of the scanner and cannot be detected.

SUMMARY

An embodiment of this invention solves such problems of the prior art using an image forming apparatus, information processing apparatus, image forming system, image position correcting method, recording media, and a computer-readable program that can easily match the image forming position on one side of paper with the image forming position on the other side of paper and correct page positions on both sides of the paper.

To solve at least one of the above and other problems, embodiments of the present invention include an image forming apparatus that can form images on both sides of paper. In one embodiment, the image forming apparatus comprises: an image former which forms, on both paper sides, reference positioning images which indicate reference positions on both sides of a first paper; an image reader having a image readable area; and a controller which controls the image former to match the image forming position on one side of a second paper with the image forming position on the other side of the second paper according to read-out information including the reference positioning images read from parts of the first paper by the image reader.

When forming images on both sides of the first paper, the image former of the above mentioned image forming apparatus, for example, reference positioning images on positions of both sides of the first paper. For this purpose, the image reader, having an image readable area, reads reference images through this image readable area, for example, from multiple parts on both sides of the first paper or from the folded first paper. The controller calculates the difference between a distance from the reference position to the reference images on one side of the first paper and a distance from the reference position to the reference images on the other side of the first paper according to the information of the reference images read by the image reader and detects the displacement between the image forming position on one side of the first paper and the image forming position on the other side of the first paper. Further, the controller controls the image former to match the image forming position on one side of the second paper with the image forming position on the other side of the second paper according to the displacement and controls the print-out positions of images on the second paper greater in size than the image readable area and read from multiple parts on both sides of paper or from the folded first paper.

For example, when the first paper having reference images on it is greater in size than the image readable area of the image reader, the paper may be folded to make its image area smaller and the reference images on both sides of the first paper may be read by the image reader. The controller detects the displacement between the image forming position on one side of the first paper and the image forming position on the other side of the first paper from the information of the reference images read by the image reader.

The objects, characteristics and properties of this invention other than those set forth above will become apparent from the description given herein below with reference to preferred embodiments illustrated in the accompanying drawings.

BRIEF DESCRIPTION OF THE DRAWINGS

FIG. 7A to FIG. 7C show an example of combination of image data Din1 and Din2 read from the alignment pattern P1 consistent with an embodiment of the present invention.

DETAILED DESCRIPTION

Below will be explained image forming apparatus, image forming systems, information processing apparatus, image position correcting methods, recording media, and computer-readable programs consistent with embodiments of this invention with reference to accompanying drawings.

Figure 1:
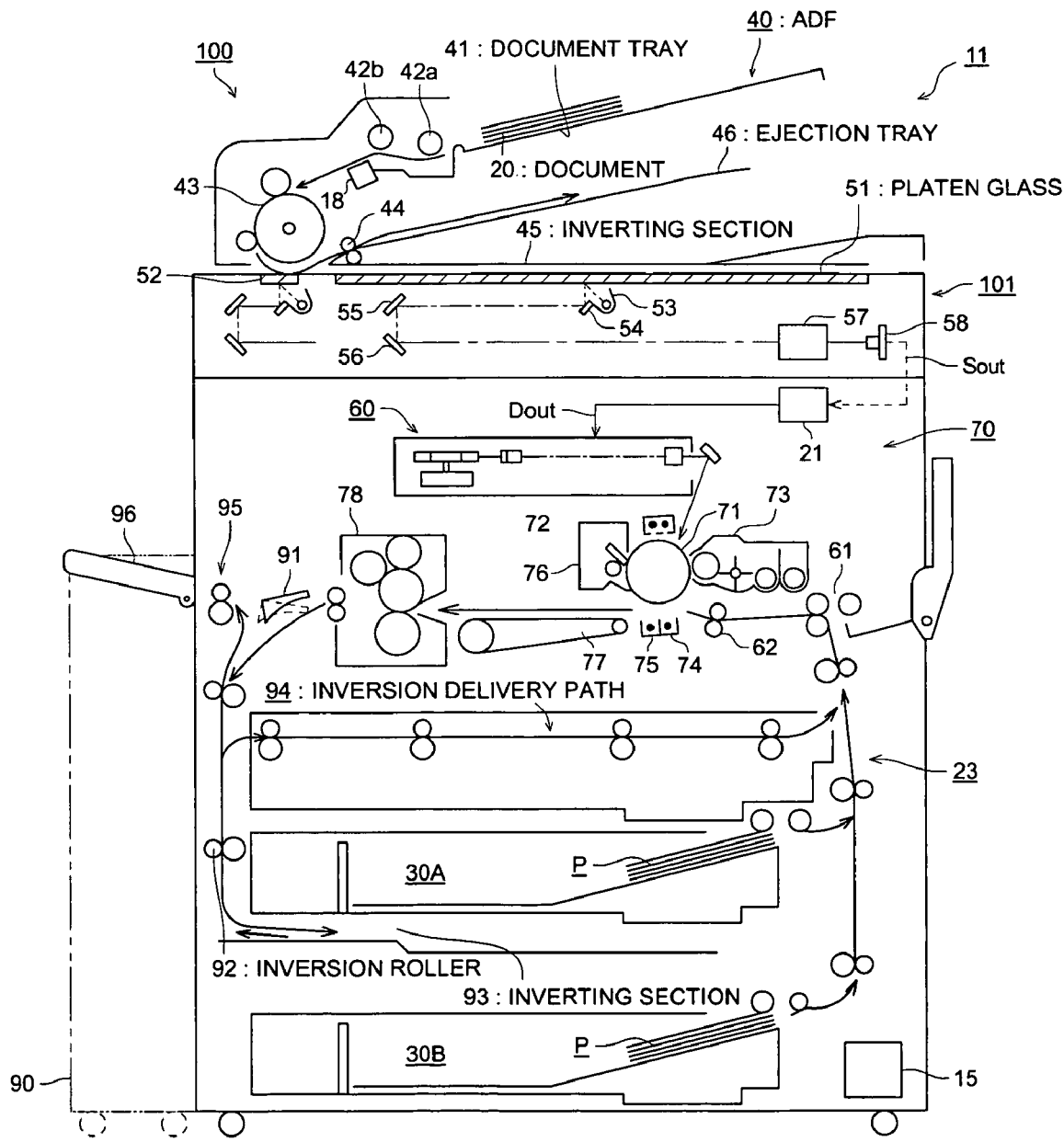
FIG. 1 shows a vertical sectional view, as a basic concept, of a digital copying machine 100 consistent with an embodiment of this invention.

FIG. 1 shows a vertical sectional view, as a basic concept, of a digital copying machine 100 consistent with an embodiment of this invention.

The copying machine 100 of FIG. 1 constitutes one example of an image forming apparatus which reads documents 20, generates digital image data and forms monochromatic images on both sides of paper P according to the data Dout. In addition to the copying machine 100, the image forming apparatus may be applied to monochromatic printers, MFPs, etc. The copying machine 100 forms monochromatic images by a direct transfer method and is equipped with an image reader 11 and an image former 70. The image reader 11 has a preset image readable area and scans document images in either Automatic Document Feed or Platen mode.

The Automatic Document Feed mode automatically feeds documents 20 from an automatic document feeder (ADF) 40 and automatically reads them. The Platen mode scans a document 20 on a platen glass 51 and automatically reads its image.

Figure 2:
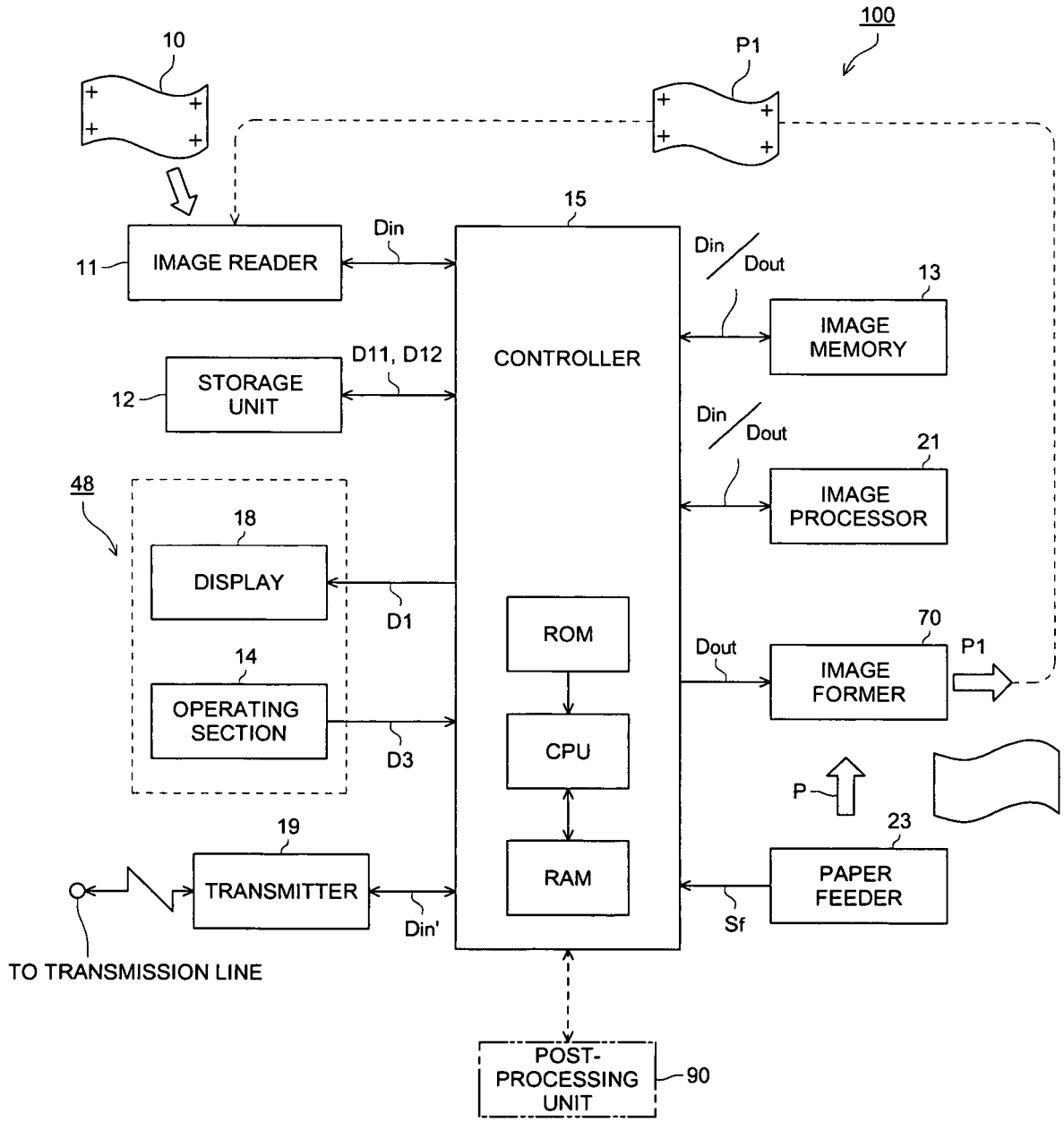
FIG. 2 is a functional block diagram showing an example of the control-related circuit of the copying machine 100 consistent with an embodiment of the present invention.

The ADF 40 on the top of the image reader 11 may automatically feed documents 20 or reference chart 10 (e.g., See FIG. 2). The reference chart 10 is a sheet-like recording medium (e.g., a piece of paper) on which reference images are printed to position images on both sides of paper P. The reference images are, for example, cross-shaped marks. The reference chart 10 is used to detect and correct positional displacements of images on both sides of paper which may be caused by (1) difference in magnification between longitudinal and transversal directions, (2) difference in timing between longitudinal and transversal directions, (3) tilting and skewing, and so on.

The ADF 40 consists of a document tray 41, rollers 42a, 42b, and 43, delivery rollers 44, and an ejection tray 46. The document tray 41 accepts one or more documents 20. When the Automatic Document Feed mode is selected, a document 20 is fed from the document tray 41, delivered by rollers 42a and 42b in the downstream side of the document tray 41, and U-turned by the roller 43 in the downstream side. In the Automatic Document Feed mode, documents 20 are placed on the document tray 41 with their recording sides faced upward.

The image reader 11 consists of a first platen glass 51, a second platen glass (ADF glass) 52, a light source 53, mirrors 54, 55, and 56, an imaging optic section, a CCD image pick-up device 58 and an optical system driving section which is not shown in the drawing. The CCD image pick-up device 58 in use is a reduction type image sensor. The CCD image pick-up device 58 reads the document 20 and outputs an image read-out signal $S_{out}$. Specifically, when the document 20 U-turns on the roller 43 in the Automatic Document Feed mode, the CCD image pick-up device 58 reads the surface of the document 20 through the ADF glass 52 and outputs an image read-out signal $S_{out}$. After it is read by the image reader 11, the document 20 is delivered to the ejection tray 46 by the delivery rollers 44.

A platen cover (not shown in the drawing) is provided under the ADF 40. In one embodiment, the platen cover has a color different from that of the document sheet 20 and is greater in size than the document sheet 20. In the Platen mode, the document 20 or reference chart 10 is put in place on the platen glass 51 with its recording side faced down and clamped by the platen cover.

In this mode, the image reader 11 causes the optical driving section to move the light source 53, and mirrors (54, 55, and 56) to scan the platen cover and the image forming side of the document 20. The CCD image pick-up device 58 outputs an image read-out signal $S_{out}$ as the result of document scanning.

Besides the image reader 11 and the image former 70, the image forming apparatus may contain an image processor 21, paper feed trays (30A and 30B), a controller 15, an image writing section 60, and so on. The output stage of the CCD image pick-up device 58 is connected to the image processor 21 and outputs an image read-out signal $S_{out}$ to the image processor 21. The image processor 21 converts the analog signal $S_{out}$ to digital image data $D_{in}$. After carrying out image processing on the digital image data $D_{in}$, the processed image data is output as digital image data $D_{out}$ to the image writing section 60 under control of the controller 15. The image writing section 60 generates a laser light of preset intensities corresponding to the image data $D_{out}$.

The image former 70 is provided opposite the image writing section 60 and forms an image according to the image data Din that is obtained by the image reader 11. The image former 70 forms an image on paper P supplied from one of the paper feed trays 30A and 30B. The image former 70 consists of an organic photosensitive drum (simply abbreviated as a photosensitive drum below) 71, a charger 72, a developer 73, a transfer unit 74, a separator 75, a cleaning section 76, a delivery mechanism 77, and a fixing device 78.

The charger 72 is provided above this photosensitive drum 71 to charge the surface of the photosensitive drum 71 evenly at a preset potential. The image writing section 60 is provided, for example, to the oblique upper right side of the photosensitive drum 71, applies laser light of preset intensities to the photosensitive drum 71 according to the processed image data $D_{out}$ to form an electrostatic latent image on the surface of the photosensitive drum 71.

The developer 73 containing toner and carrier (as a developing agent) is provided to the right of the photosensitive drum 71. The latent image formed on the photosensitive drum 71 by the image writing section 60 is made visible with this toner. Below the developer 73 are provided registration rollers 62 and paper feed trays (30A and 30B).

The transfer unit 74 transfers the toner image that was formed on the photosensitive drum 71 by charging, exposing, and developing to paper P whose delivery timing is controlled by the registration rollers 62. The separator 75 is provided near the transfer unit 74 to separate the image-transferred paper P from the photosensitive drum 71. In the downstream side of this separator 75 is provided a delivery mechanism 77. The fixing device 78 is provided at the end of the delivery mechanism 77. The fixing device 78 fixes the toner image firmly onto the paper P. A cleaning section 76 is provided opposite the photosensitive drum 71 between the delivery mechanism 77 and the charger 72 to remove left-over toner from the photosensitive drum 71.

When the Double-Side Copy mode is selected in the above example, an image is formed on one side (or the front side) of paper P and another image is formed on the other side (the back side) of the paper P after the paper P is ejected from the fixing device 78. In this mode, the paper P coming from the fixing device 78 is branched from the paper ejection path by the branching claw 91, turned upside down by the inversion rollers 92 and the inverting section 93. The inverted paper P goes through the inversion delivery path 94 and enters the normal paper feed path before the paper feed rollers 61. The paper is further delivered to the transfer unit 74 through the registration rollers 62 and receives a toner image on the other side (i.e., the back side) of the paper P. Then the paper P having a toner image on the back side is fixed by the fixing device 78, clamped by the ejection rollers 95, and ejected to the paper ejection tray 96 or the like outside the apparatus.

Paper sheets P available to the above image formation may include, for example, thin paper of 52.3 to 63.9 kg/m² (per 1000 sheets), normal paper of 64.0 to 81.4 kg/m² (per 1000 sheets), thick paper of 83.0 to 130.0 kg/m² (per 1000 sheets), and very thick paper of 150.0 kg/m² (per 1000 sheets). Image forming conditions may include, for example, a linear paper speed of 80 to 350 mm/sec, ambient temperature of 5 to 35° C., and ambient relative humidity of 15 to 85%. Available paper thicknesses may include, for example, 0.05 to 0.15 mm.

FIG. 2 is a functional block diagram showing an example of the control-related circuit of the copying machine 100. In one embodiment, the copying machine 100 of FIG. 2 consists of an image reader 11, a storage unit 12, image memory 13, a controller 15, a transmitter 19, a paper feeder 23, an operation panel 48, and an image former 70. The image former 70 contains the image writing section 60.

In this embodiment, copying machine 100 has a Double Side Copy mode. When this mode is selected, the copying machine 100 forms images on both sides of paper P using the photosensitive drum 71 of FIG. 1 according to image data $D_{out}$. The Double Side Copy mode here is defined as an operation to form (or print) images on both sides of selected paper P.

In addition to the Double Side Copy mode, the copying machine 100 has a Page Alignment mode to correct image positions on both sides of paper. When this mode is selected, the copying machine 100 reads a reference chart 10 and prints cross-shaped marks on a selected paper sheet P using the photosensitive drum 71 according to the image data Din of the reference chart 10. The Page Alignment mode reads a reference chart 10, prints out the reference chart 10 on both sides of selected paper according to the image data $D_{out}$ of the reference chart 10, reads out the printed reference chart 10 from the paper P to generate digital image data $D_{in}$, detects a displacement of marks of the reference chart 10 on the paper P according to the image data $D_{in}$, and adjusts the image former 70 to remove the displacement.

The operation panel 48 consists of an operating section 14 and a display 18. The operating section 14 is connected to the controller 15 and manipulated to set the Image Formation mode or the Page Alignment mode. In the Image Formation mode, the operating section 14 is manipulated to select a paper feed tray 30A or 30B in the paper feeder 23. The operating section 14 is also manipulated to set an image forming condition. Operation data D3, including data such as an image forming condition, and tray selection information is sent from the operating section 14 to the controller 15. The display 18 is connected to the controller 15 and controlled to display operation data that is selected and set by the operating section 14. The image forming conditions and tray selection data are converted to display data D2 before being displayed on the display 18.

In this example, the controller 15 contains read-only memory ROM 24, a central processing unit 25 (hereinafter abbreviated as CPU) and random-access memory RAM 26. The ROM 24 stores system program data to control the copying machine. At least a part of the RAM 26 is used as work memory. For example, the RAM 26 temporarily stores image data $D_{in}$, control commands, and so on. In this example, at start-up the CPU 25 reads system program data from the ROM 24, starts the system, and controls the copying machine by the operation data D3 sent from the operating section 14.

In addition to the ROM 24 and the RAM 26, a storage unit 12 is provided in this example and connected to the controller. The storage unit 12 consists of a non-volatile memory and stores a program to execute the Page Alignment mode. This program is made readable by the CPU 25. In another embodiment, this program may be stored, for example, in ROM 24 or RAM 26.

The program that executes the Page Alignment mode contains code for directing a processor to form, on common reference positions of both sides of paper P, reference positioning images (hereinafter abbreviated as mark images) that are arranged in a time series to correct image forming positions on both sides of paper, read the mark images through the image readable area from multiple parts of the paper P or the folded paper P, calculate a difference between a distance from one end of the paper P to the mark image on one side of the paper P and a distance from the other end of the paper P to the mark image on the other side of the paper P according to the information of the mark images detect a displacement between the print-out mark image positions on both sides of paper, and match the image forming position on one side of the paper P with the image forming position on the other side of the paper P according to the quantity of the displacement.

Even when images are formed on paper that is greater in size than the image readable area of the image reader 11, this program can detect a displacement between the mark image position on one side of the paper P and the mark image position on the other side of the paper P and match the image forming positions on both sides of paper P according to the quantity of displacement that was detected.

In one embodiment, the storage unit 12 stores adjustment values used by the program. When the adjustment values are updated, they are stored here. The adjustment values are read by the CPU 25 from the storage unit 12 in the Page Alignment mode. The adjustment values are used as offset values to match the image forming positions on both sides of the paper P.

The controller 15 is connected to the image reader 11, image memory 13, and the image processor 21 in addition to the above storage unit 12. When the operating section 14 selects the Page Alignment mode, the CPU 25 in the controller 15 reads the program from the storage unit 12 and executes the Page Alignment mode.

The image reader 11 is used to read the reference chart 10 through the image readable area from multiple parts of the both sides of paper or from the folded paper P on which the reference chart 10 is formed by the image former. For example, in the Page Alignment mode, the image reader 11 is used to read mark images of the reference charts 10 printed on both sides of the paper according to the image data for creation of the reference chart. The image reader 11 outputs image data $D_{in}$ to the controller 15.

The image data $D_{in}$ is processed by the image processor 21 under control of the controller 15 and stored in image memory 13. The image memory 13 may be, for example, a hard disk, SDRAM with a backup function, or the like. The processed image data $D_{out}$ is sent to the image writing section 60 in the image former 70.

In the Page Alignment mode, the controller 15 corrects print-out positions of mark images (which were read from multiple parts of the paper P from the folded paper) on both sides of paper P which is greater in size than the image readable area of the image reader 11. For example, the controller 15 controls the image former 70 to form (print) cross-shaped mark images on four corners of each side of the paper P according to the image data which is prepared for creation of a reference chart.

The image writing section 60 generates laser light of preset intensities according to the image data $D_{out}$ and scans the surface of the photosensitive drum 71 with this laser light to form a latent image on the drum 71. The image forme 70 develops this latent image on the drum 71 and transfers it onto the selected paper P.

The mark images are formed on both sides of the paper P and then the paper is ejected. The paper P having the mark images on it is used as a reference chart sheet 10. The user sets this reference chart sheet 10 on the image reader 11 to let the controller recognize the displacement of positions of the reference charts 10 on both sides of the paper.

When reading mark images printed on both sides of the reference chart sheet 10, the user places, on the back of the reference chart sheet 10, an auxiliary member which is greater in size than the reference chart sheet 10 and has a contrast (e.g., a density difference) with the images on both sides of the paper. The auxiliary member is, for example, a sheet of paper whose color is different from that of the reference chart sheet 10. With this, the edges of the reference chart sheet 10 become clearer and the positional displacement of images on both sides of the sheet 10 can be detected more precisely.

When reading the mark images on both sides of the reference chart sheet 10 by the image reader 11, the user can set a lower scanning speed in the mark image areas than in the non-mark areas. This setting is sent from the operating section 14 to the controller 15. For example, when the scanning speed of a scanner 201 having a resolution of 600 dpi is reduced by half, the mark images can be scanned at a resolution of 1200 dpi. This means that the mark images are magnified twice in image processing.

When handling a reference chart sheet 10 which is greater in size than the image readable area, the image reader 11 reads cross-shaped mark images from multiple parts of both sides of the reference chart sheet 10 or from the folded sheet 10 through the image readable area. The controller 15 converts the image data $D_{in}$ of mark images read from both sides of the multiple parts of the reference chart sheet 10 or from the folded reference chart sheet 10 into the size of the reference chart sheet 10 which is greater in size than the image readable area of the image reader 11. As a result of this conversion, the controller 15 calculates a adjustment value to eliminate the displacement between the image forming positions of both sides of the reference chart sheet 10.

For example, the CPU 25 may calculate a difference between a distance from the reference position to the reference images on one side of the paper and a distance from the reference position to the reference images on the other side of the paper according to image data $D_{in}$ read by the image reader 11. Then, the CPU 25 detects the displacement between print-out positions of mark images on both sides of the reference chart sheet 10 and controls the image former 70 to match the image forming positions on both sides of the reference chart sheet 10 according to this quantity of displacement.

In the Image Formation mode, the controller 15 controls the image writing section 60 and the image former 70 to form images according to the setting made on the operation panel 48. For example, the controller 15 outputs the processed image data $D_{out}$ to the image writing section 60 and the image formation signal Sp to the image former 70 to control image formation.

In addition to the image writing section 60 and the image former 70, a transmitter 19 is connected to the controller 15. The transmitter 19 is also connected to a transmission line such as LAN for communication with external computers and the like. When the image forming apparatus 100 is used as a printer (In the Print mode), the transmitter 19 works to receive image data $D_{in}'$ from an external computer.

A paper feeder 23 is connected to the controller 15. In the Image Formation mode, the paper feeder 23 selects a paper tray 30A or 30B (FIG. 1) according to the Paper Feed Control signal Sf which is sent from the controller 15 to the paper feeder 23. The paper feeder 23 contains a motor (not shown in the drawing) to drive delivery and feed rollers and an IC chip to control driving of the motor. The paper feed trays 30A and 30B respectively contain paper P of a preset size (A3, A3-wide, A4, etc.) and a preset paper quality.

In some cases, a post-processing unit 90 is connected to the controller 15. The post-processing unit 90 may have, for example, a Z-folding function. The user can use this function to make accordion-folding (including mountain- and valley-folds) of the reference chart sheet 10 having images on both sides.

Figure 3:
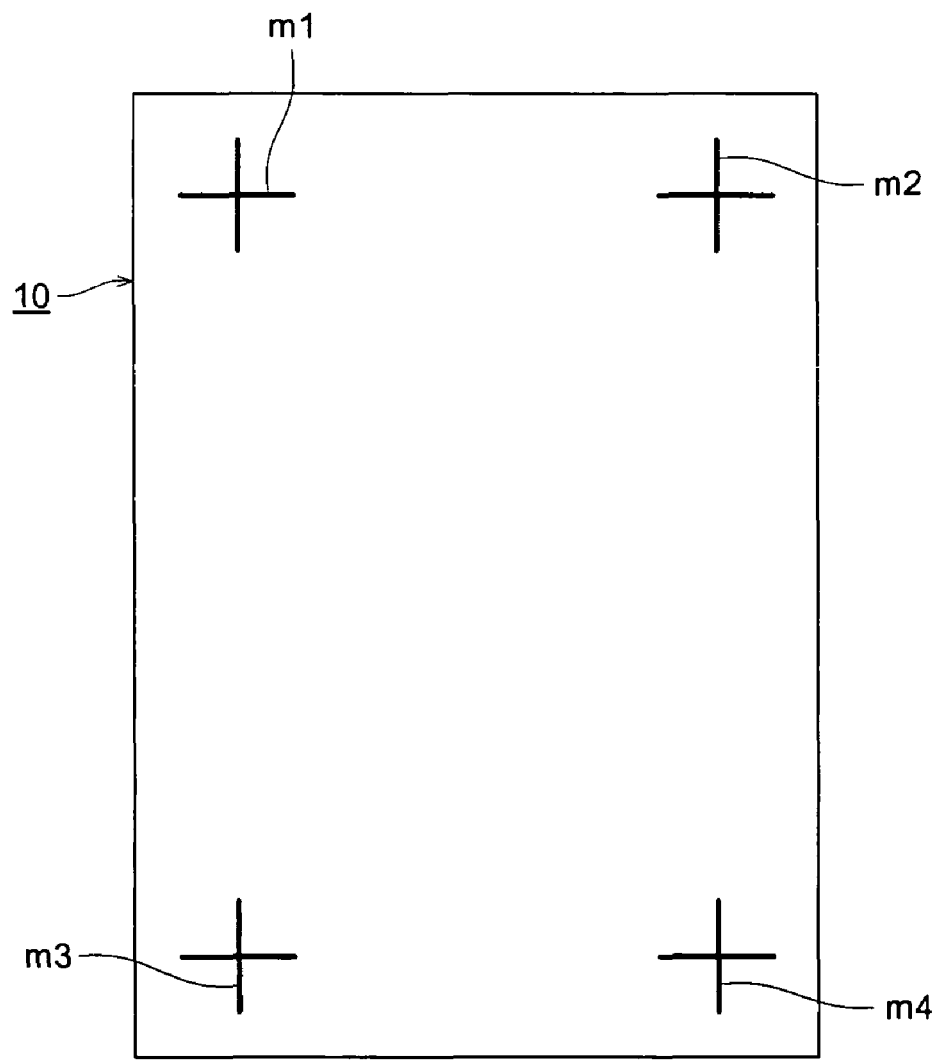
FIG. 3 shows an example of a reference chart 10 consistent with an embodiment of the present invention.
Figure 4:
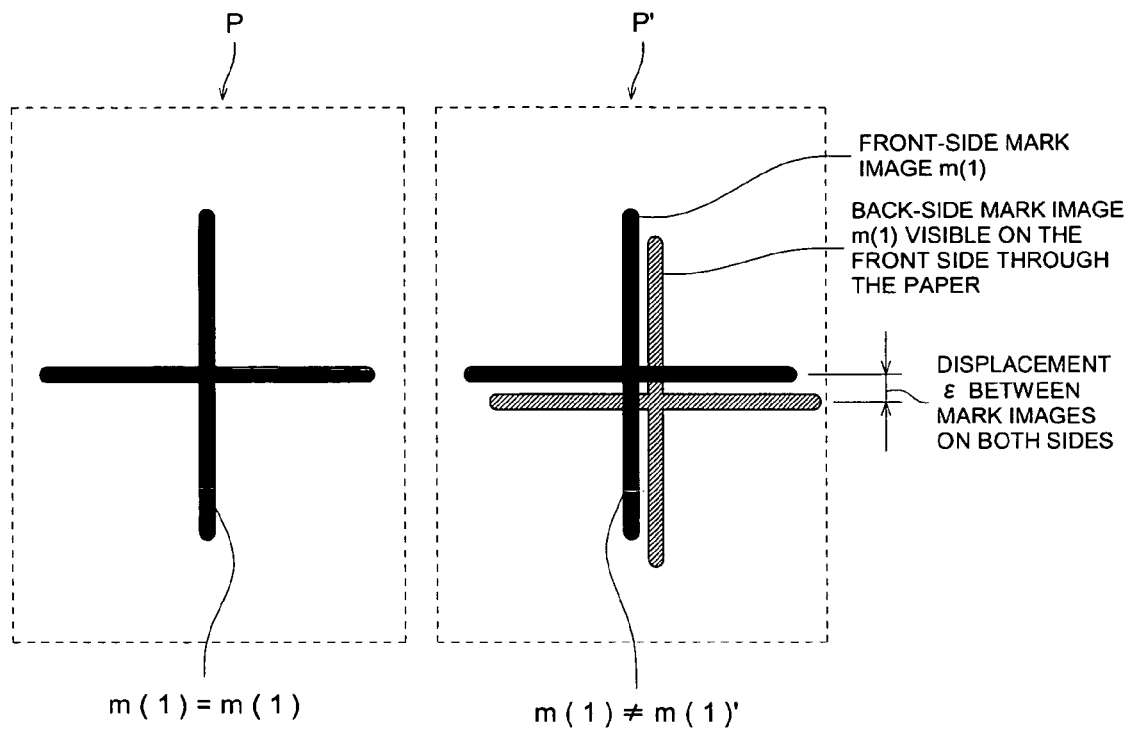
FIG. 4A and FIG. 4B respectively show examples of formation of a mark image m(1) on one side of paper consistent with an embodiment of the present invention.

FIG. 3 shows an example of a reference chart 10. The mark images of FIG. 4 are formed (e.g., printed) according to the image data for creation of a reference chart. The reference chart 10 has a cross-shaped mark image (e.g., m1, m2, m3, or m4) printed at each of four corners on one side of a piece of paper P. The size of the paper is arbitrary. Usually, the paper P is as big as the image readable area (the maximum scan size) of the image reader 11. For example, when the maximum scan size is as big as an A3-size document, an A3-size or smaller paper sheet P is selected to print mark images m1 to m4. However, to meet a user's demands, for example, a demand to print booklet covers, A3-Wide paper sheets or other paper which is a little greater than A3-size paper may be used to print the mark images m1 to m4.

The image data for creation of a reference chart is stored in the storage unit 12 or image processor 21. With this, the image data for creation of a reference chart can be supplied from the image processor 21 to the image former 70 in the Page Alignment mode and the image former 70 can print cross-shaped mark images m1 to m4 on the corners of each side of the A3-Wide paper P.

FIG. 4(A) and FIG. 4(B) respectively show magnified views of a mark image m(1) on one side of paper. FIG. 4A shows a mark image m(1) that is printed on each side of the paper P (which may be, for example, reference chart 10) according to the mark image m1 of the image data for creation of a reference chart. In FIG. 4(A), a mark image m(1) printed on one side of the paper is flush with a mark image m(1) printed on the other side of the paper.

In such a case, the image forming positions are equal on both sides of the paper and the Page Alignment mode need not be executed. The mark images are not limited to cross-shaped images and can be any mark that is effective for detection of exact mark forming positions. Such mark images are not shown in the drawing. They can be, for example, black dot patterns or the other symbols. This example is explained using the cross-shaped marks "+" m(1) to m(4).

Mark images m(1) and m(1)' of FIG. 4(B) are respectively printed on both sides of paper P' according to the mark image m1 of the image data for creation of a reference chart. In this example, a "+" mark image m(1) is printed in black on one side (front) of the paper and another "+" mark image m(1)' is printed, for example, in gray (dotted) on the other side (back) of the paper. For example, it is visible on the front side through the paper.

In this case, the mark image m(1) on the front side is not flush with the mark image m(1)' printed on the back side of the paper. In other words, the mark images are out of alignment. The displacement between these mark images m(1) and m(1)' is expressed by ϵ.

When the mark images are shifted on both sides of paper P' as explained above, the controller executes the Page Alignment mode to remove the relative error between the image forming positions on both sides of paper P'. The controller causes the image reader 11 to read mark images m(1) to m(4) on each side of the paper P' and detects the displacement ϵ.

When handling a reference chart 10 which is greater in size than the image readable area of the image reader 11, the controller controls the image reader 11 to read mark images m(1) to m(4) from multiple parts of both sides of the reference chart sheet 10 or from the folded reference chart sheet 10.

Figure 5:
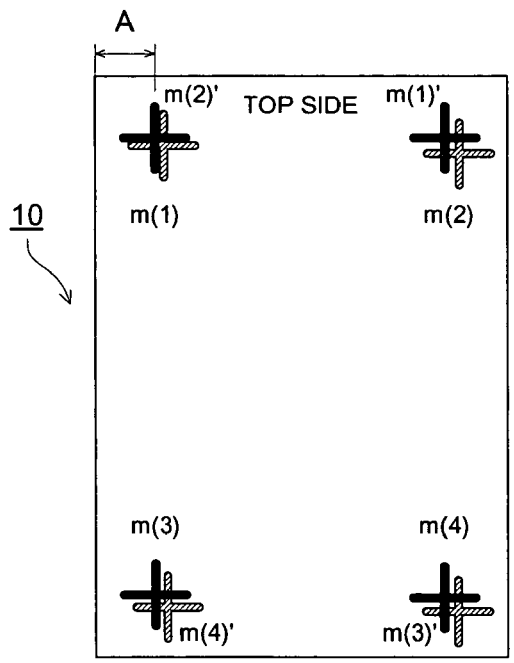
FIG. 5A and FIG. 5B respectively show examples of formation of mark images m(1) to m(4) on both sides of paper consistent with an embodiment of the present invention.
Figure 5:
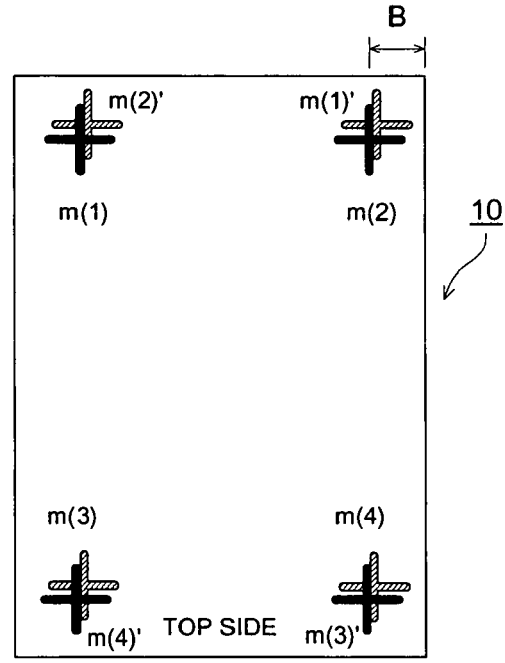
Figure 5:
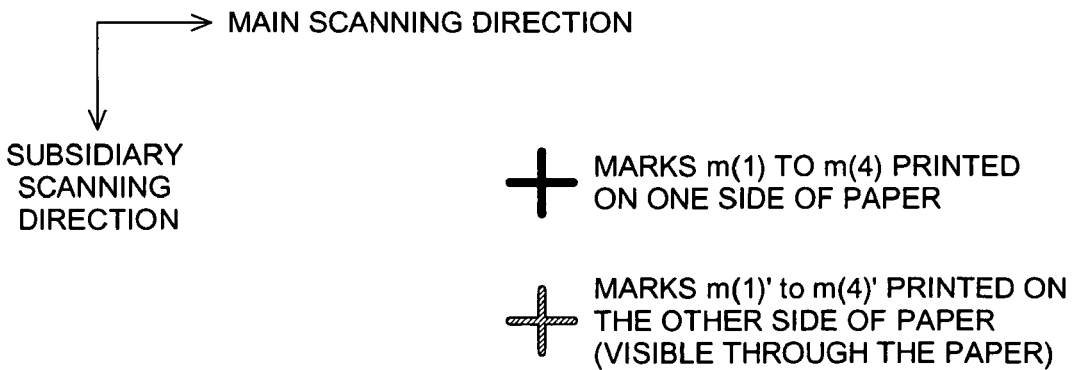

FIG. 5(A) and FIG. 5(B) respectively show an example of formation of mark images m(1) to m(4) on both sides of the reference chart 10. For convenience of explanation, this example places the front side of the reference chart sheet 10 with its top upward and the back side of the reference chart sheet 10 with its side downward.

The black "+" mark images m(1) to m(4) of FIG. 5(A) are printed on one side (front) of paper P according to the mark images m1 to m4 of the image data for creation of a reference chart. The gray "+" mark images m(1)' to m(4)' of FIG. 5(A) are printed on the other side (back) of paper P according to the mark images m1 to m4 of the image data for creation of the reference chart and are visible on the front side through the paper.

In FIG. 5(A), the mark image m(2) printed on the back side of the paper is visible (through the paper) near the mark image m(1) on the front side of the paper. Similarly, the mark image m(1) printed on the back side of the paper is visible (through the paper) near the mark image m(2) on the front side of the paper. The mark image m(4) printed on the back side of the paper is visible (through the paper) near the mark image m(3) on the front side of the paper. The mark image m(3) printed on the back side of the paper is visible (through the paper) near the mark image m(4) on the front side of the paper.

The mark images m(1) to m(4) of FIG. 5(B) are printed on the other side (back) of the reference chart sheet 10' according to the mark images m1 to m4 of the image data for creation of a reference chart 10. The gray mark images m(1)' to m(4)' of FIG. 5(B) are printed (black "+" marks) on the front side of the paper) and are visible on the back side through the paper.

In FIG. 5(B), the mark image m(2) printed on the front side of the paper is visible (through the paper) near the mark image m(1) on the back side of the paper. Similarly, the mark image m(1) printed on the front side of the paper is visible (through the paper) near the mark image m(2) on the back side of the paper. The mark image m(4) printed on the front side of the paper is visible (through the paper) near the mark image m(3) on the back side of the paper. The mark image m(3) printed on the front side of the paper is visible (through the paper) near the mark image m(4) on the back side of the paper.

In the above examples of image formation on both sides of paper, one end (e.g., the left edge) of the front side of the reference chart sheet 10 of FIG. 5(A) is used as a reference position. In this example, the CPU 25 calculates a difference (A−B) between distance A and distance B (where distance A is a distance from this reference position to the position of the mark image m1 on the front side of the paper and distance B is a distance from the reference position (the other end (e.g., the right edge) on the back side) of the reversed reference chart sheet 10) to the position of the mark image m(2) on the back side of the paper.

In this example, the controller causes the image reader 11 to scan respective mark images m(1) to m(4) once on each side of the reference chart sheet 10 and detects the displacement ϵ of mark images on both sides of the reference chart sheet 10 using a total of twice of m(1) to m(4). For this detection, both sides of the reference chart sheet 10 preferably have a common reference position. The common reference position is not limited to the above edges (corners or ends) of reference chart sheet 10. It can be, for example, a hole (not shown in the drawing) punched out on the reference chart sheet 10.

The CPU 25 detects a displacement $\epsilon$ between the mark image m(1) on one side of the reference chart sheet 10 and the mark image m(2) on the other side of the reference chart sheet 10 according to the image data Din sent from the image reader 11. This displacement can be calculated also by using mark images m(3) and m(4). In summary, image displacements can be detected by respectively scanning each side of the reference chart sheet 10 and getting positions of mark images m1 to m2 relative to the common reference position. With this, the positional displacement can be detected on both sides of the reference chart sheet 10.

The CPU 25 controls the image former 70 to match the image forming positions on both sides of the reference chart sheet 10 according to the displacement $\epsilon$. With this, the positional displacement in the main scanning direction can be corrected. It is possible to correct the positional displacement in the subsidiary scanning direction by using the mark images m(1) and m(3) or mark images m(2) and m(4).

Figure 6:
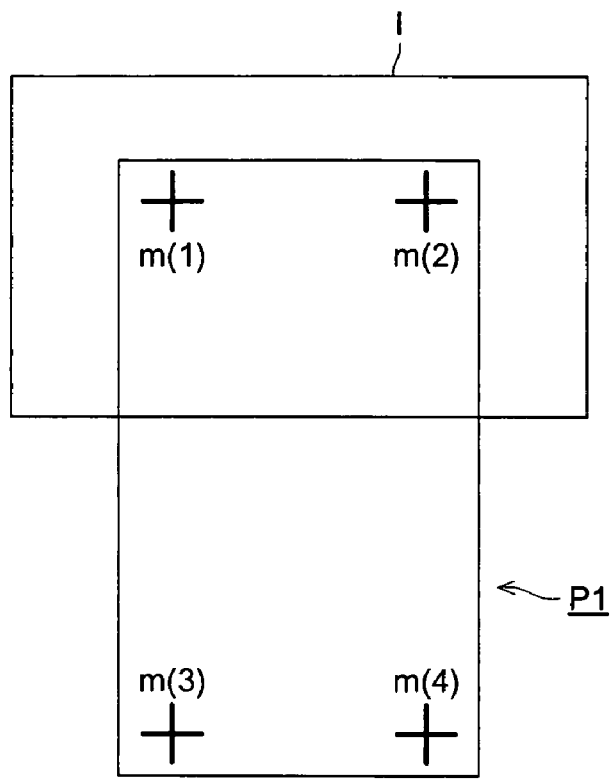
FIG. 6 is a shows an example of a alignment pattern sheet P1 which is greater than the image readable area I in the image readable area I consistent with an embodiment of the present invention.

FIG. 6 is a conceptual example of placing a alignment pattern P1 which is greater than the image readable area I.

In this example, mark images of image data for creation of a reference chart are printed on paper P1 which exceeds the image readable area of the image reader 11. For example, the alignment pattern P1 of FIG. 6 is an example of reference chart 10, in which cross-shaped mark images m(1) to m(4) according to the image data for creation of a reference chart are formed (printed) on a paper sheet (e.g. A3-Wide size) that is greater than the image readable area of the image reader 11.

The mark images m(1) to m(4) are printed on the corners of each side of the paper. In one example, A3-Wide paper P is used for a cover for an A4-size booklet. The two-fold A3-Wide paper is a little larger than the A4 size paper.

This example forms (prints) images on both sides of an A3-Wide paper sheet P which is greater in size than the maximum scan size (A3 size) of the image reader 11 and eliminates the displacement $\epsilon$ between the mark images formed on both sides of the paper. In this case, the image reader 11 divides one side (front or back side) of the reference chart 10 having the mark images m(1) to m(4) into two parts (e.g., upper and lower halves) and reads these parts separately through the image readable area I. This is because it is impossible to detect the edge of the A3-Wide alignment pattern sheet P1.

The user first puts the upper half of the alignment pattern sheet P1 (having the mark images m(1) to m(4) on it) in place in the image readable area I and causes the image reader 11 to read the mark images m(1) and m(2) on the upper half of the alignment pattern sheet P1. Then the user turns the alignment pattern sheet P1 by 180° to set the lower half of the alignment pattern sheet P1 in place in the image readable area I and causes the image reader 11 to read the mark images m(3) and m(4) on the lower half of the alignment pattern sheet P1. In this way, the Page Alignment mode is executed according to the image data Din of the image marks m(1) to m(4) that are read in twice from the alignment pattern P1.

FIG. 7(A) to FIG. 7(C) are conceptual drawings showing an example of combining two kinds of image data $D_{in}1$ and $D_{in}2$ of the alignment pattern P1.

The alignment pattern P1($u$) of FIG. 7(A) is expressed by the split image data $D_{in}1$ (including data of mark images m(1) and m(2)) on the upper half of the paper) which is read by the image reader 11 and extracted on image memory 13 and the like. Similarly, alignment pattern P1($d$) of FIG. 7(B) is expressed by the split image data $D_{in}2$ (including data of mark images m(3) and m(4) on the lower half of the paper) which is read by the image reader 11 and extracted on image memory 13 and the like.

This example combines the split image data $D_{in}1$ (including data of mark images m(1) and m(2) and the split image data $D_{in}2$ (including data of mark images m(3) and m(4)) on image memory 13 according to the size data of the reference chart 10 pertaining to the preset alignment pattern P1. The combined alignment pattern P1 is expressed by the alignment pattern P1($u$), the alignment pattern P1($d$), and an offset. Specifically, the image data Din is expressed by a set of Din1, Din2, and offset.

When creating a alignment pattern P1, the user enters the size data of the reference chart 10 from the operating section 14. The CPU 25 receives operation data D3 from the operating section 14 and stores the size data of alignment pattern P1 in RAM 26 and the like according to the data D3. The size data of the alignment pattern P1 is read from RAM 26 when image data is combined. This enables reconstruction of the size of the reference chart 10 such as the A3-Wide size on image memory 13. Further, the size is converted to the size of the original reference chart 10 and used to calculate the quantity of displacement. The calculation of the displacement is already explained in FIGS. 4(A) and 4(B) and FIGS. 5(A) and 5(B).

Figure 8:
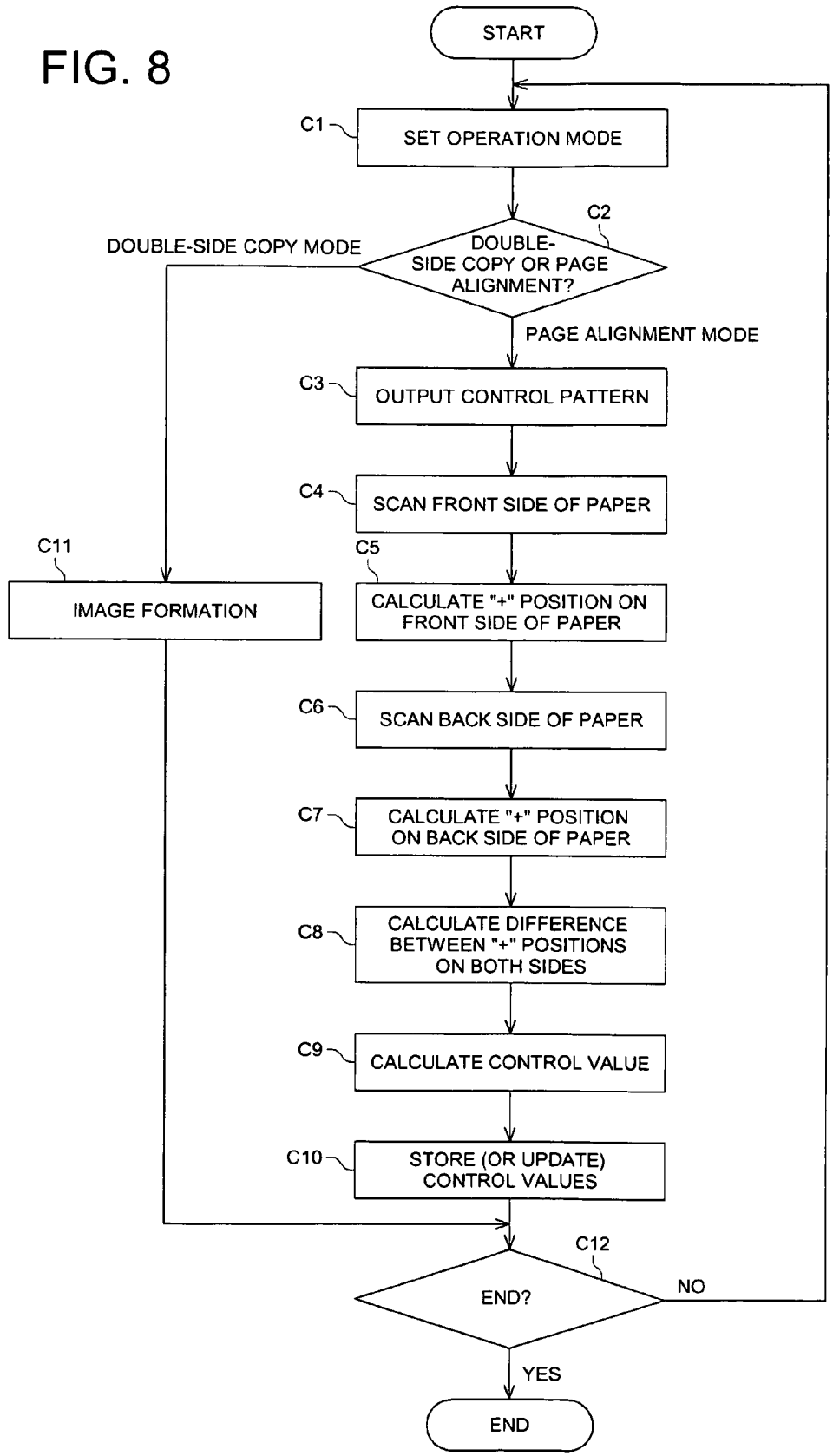
FIG. 8 shows an example of image processing performed by the copying machine 100 consistent with an embodiment of the present invention.
Figure 9:
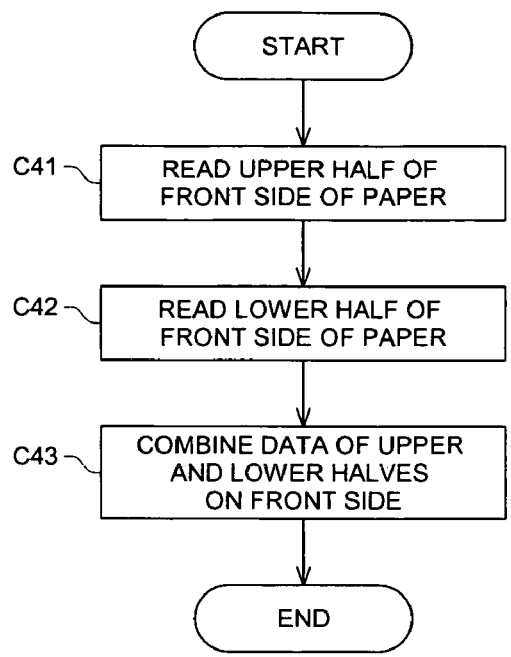
FIG. 9A and FIG. 9B respectively show image processing subroutines as examples consistent with an embodiment of the present invention.
Figure 9:
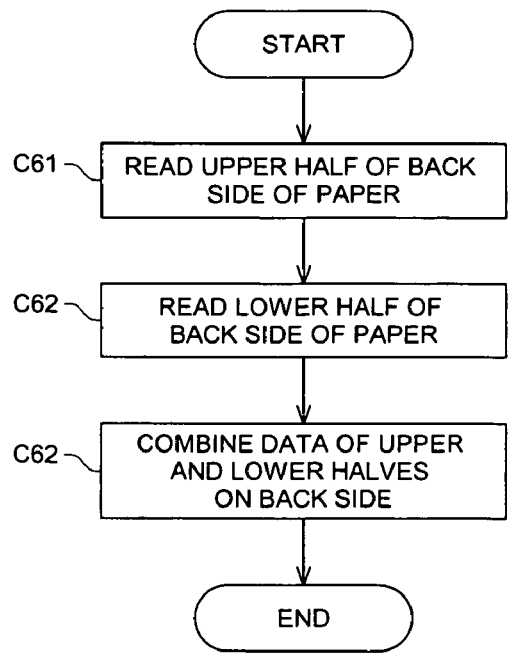

Next will be explained a method of correcting image forming positions in accordance with an embodiment of this invention. FIG. 8 shows an example of image processing performed by copying machine 100. FIG. 9(A) and FIG. 9(B) respectively show operation flows of image processing subroutines as examples.

This example assumes correction of image forming positions on both sides of paper in the Page Alignment mode and use of a alignment pattern P1 (reference chart 10 for both-side image formation) of A3-Wide size or the like which is greater than the maximum scan size of the image reading system. In this example, the reference position is a paper edge which is common to both sides of the reference chart 10. Operation modes available to this example are a normal Double-Side Copy mode and a Page Alignment mode.

When the power switch of the copying machine is turned on, the CPU 25 inputs an operation mode (step C1). In this case, the user may enter an operation mode using operating section 14. The user selects a Double-Side Copy mode or a Page Alignment mode on a menu screen or the like (not shown in the drawing) of a display 18 (step C2).

When selecting a Page Alignment mode, the user enters data of the size of the reference chart sheet 10. The CPU 25 stores the size data of the alignment pattern P1 in RAM 26 or the like according to the operation data D3 from the operating section 14.

When a Page Alignment mode is selected (step C2: Page Alignment mode), the CPU 25 controls the image reader 11 and the image former 70 to form a alignment pattern P1 (step C3). For example, the CPU 25 reads image data for creation of a reference chart from the storage unit 12 and sends it to the image processor 21. The image data $D_{in}$ related to mark images m1 and m2 is processed by the image processor 21 and sent from the image processor 21 to the image writing section 60 under transfer control of the controller 15.

Then the controller 15 controls the image former 70 to form cross-shaped mark images m1 to m4 on four corners of each side of the paper P according to the image data for creation of a reference chart. The size of paper P is enough for a cover of an A4-size booklet. The two-fold paper P (A3-Wide side) is a little greater than the A4-size paper.

The image former 70 forms mark images m(1) to m(4) on four corners of each side of the paper P which becomes a reference chart 10 according to the transferred image data for creation of a reference chart. For example, the image former 70 forms the mark images m(1) to m(4) on both sides of A3-Wide paper P fed from one of the paper feed trays 30A or 30B.

In this image formation, the charger 72 charges the surface of the photosensitive drum 71 evenly at a preset potential. The image writing section 60 generates a laser light of a prescribed intensity according to the processed image data $D_{out}$ and scans the surface of the photosensitive drum 71 with this laser light. As the result of irradiation and scanning with the laser light, the photosensitive drum 71 is exposed and forms a latent image of mark images m(1) to m(4) on the surface of the photosensitive drum 71.

The developer 73 applies toner to the latent image formed by the image writing section 60 and makes it visible. The transfer unit 74 transfers the toner image containing the mark images m1 to m4 (which were formed on the surface of the photosensitive drum 71 by charging, exposing, and developing) to the paper P whose delivery timing is controlled by the registration rollers 62. The separator 75 separates the paper P having a toner image on it from the photosensitive drum 71. The fixing device 78 fixes the transferred toner image onto the paper P. The cleaning unit removes left-over toner from the photosensitive drum 71.

As this example selects the Page Alignment mode, after an image is formed on one side (the front side) of the paper and fixed by the fixing device 78, another image is formed on the other side of the paper P which comes from the fixing device 78. The paper P coming from the fixing device 78 is branched from the sheet ejection path, sent to the inversion rollers 92 and the inverting section 93 which respectively constitute a paper feeder 23 in the downstream side, and turned upside down by them.

The reversed paper P goes through the inversion delivery path 94 and enters the normal paper feed path before the paper feed rollers 61. The paper is further delivered to the transfer unit 74 through the registration rollers 62 and receives a toner image on the other side (back side) of the paper P. Then the paper P having a toner image on the back side is fixed by the fixing device 78, clamped by the ejection rollers 95, and ejected to the paper ejection tray 96 or the like outside the apparatus.

The paper P having four mark images m(1) to m(4) on each side of the paper is used as a alignment pattern P1 which is an example of reference chart 10. The alignment pattern P1 is ejected from the image former 70. In this example, mark images are formed on a paper sheet P which is greater than the image readable area according to the image data for creation of a reference chart.

Therefore, the alignment pattern P1 ejected from the image former 70 is divided into upper and lower halves on one side (front side and/or back side) of the reference chart 10 having mark images m(1) to m(4) (black "+" marks). These mark images m(1) to m(4) are read at step C4. This is because, even when an A3-Wide size alignment pattern P2 is set on the image reader 11 having a maximum scan size (A3 size), the paper edge cannot be detected.

Here, the user puts the upper half of the front side of the alignment pattern P1 in place on the platen glass 51 (the image readable area) and closes the platen cover (not shown in the drawing). The image reader 11 calls, for example, a subroutine of FIG. 9(A) and executes reading of the upper half of the front side of the alignment pattern. In this case, the user can place an auxiliary member which is greater in size than the upper half of the alignment pattern P1 on the back of the alignment pattern sheet P1 having mark images m(1) and m(4) on it when scanning the pattern P1.

Naturally, the auxiliary member is not always required. The alignment pattern P1 can be scanned with the back side of the paper P1 uncovered. With this, the edges of the alignment pattern sheet P1 become clearer and the positional displacement ε of images on both sides of the sheet P1 can be detected at a higher precision. The mark images m(1) and m(2) on the upper half of the alignment pattern P1 are read into image data $D_{in}1$ by the image reader 11.

In this example, when reading the mark images m(1) to m(4), the user can set a lower scanning speed in the mark image areas (including mark images m(1) to m(4)) than in the non-mark areas through the operating section 14. This setting can magnify the mark images and increase the resolution.

Then the user takes up the alignment pattern P1 from the platen glass 51, turns it 180°, puts its lower half in place on the platen glass 51, and closes the platen cover. At step C42, the image reader 11 reads the black "+" mark images m(3) and m(4) from the lower half of the front side of the alignment pattern and generates image data $D_{in}2$.

Then, the image processor 21 combines image data $D_{in}1$ and $D_{in}2$ (step C43). For example, the image processor 21 combines the image data $D_{in}1$ pertaining to the mark images m(1) and m(2) and the image data $D_{in}2$ pertaining to the mark images m(3) and m(4) on image memory 13 according to the size data of the reference chart 10 corresponding to the preset alignment pattern P1. The size data is read from RAM 26 when the image data is combined. The alignment pattern P1 after combination of the image data is expressed by the alignment pattern P1(u), the alignment pattern P1(d), and an offset. The image data Din is expressed by a set of $D_{in}1$, $D_{in}2$, and offset. This enables reconstruction of the size of the reference chart 10 such as the A3-Wide size on image memory 13. Further, the size is converted to the size of the original reference chart 10 and used to calculate the quantity of displacement.

Next, the controller detects positions of the mark images m(1) to m(4) according to the image data Din read from the front side of the alignment pattern (step C5). For example, the controller calculates a distance A between one end (common edge) of the front side of the alignment pattern P1 and the printout position of the mark image m(1). The result of calculation (the numeric data of distance A) is temporarily stored in RAM 26 or the like.

Then, the image reader 11 reads black "+" mark images m(1) to m(4) from the back side of the alignment pattern P1 (step C6). In this case, the user puts the upper half of the back side of the alignment pattern in place on the platen glass 51 and closes the platen cover. The image reader 11 calls, for example, a subroutine of FIG. 9(B) and executes reading of the upper half of the back side of the alignment pattern(step C61). Also in this case (when scanning the back side of the alignment pattern P1), the user can place the above auxiliary member on the back of the alignment pattern sheet P1 having mark images m(1) and m(4) on it. Naturally, the auxiliary member is not always required. The alignment pattern P1 can be scanned with the back side of the paper P1 uncovered. With this, the edges of the alignment pattern sheet P1 become clearer and the positional displacement ε of images on both sides of the sheet P1 can be detected at a higher precision. The mark images m(1) and m(2) on the upper half of the alignment pattern P1 are read into image data $D_{in}1$ by the image reader 11.

Then the user takes up the alignment pattern P1 from the platen glass 51, turns it 180°, puts the lower half of the back side of the pattern sheet P1 in place on the platen glass 51, and closes the platen cover. Next, the image reader 11 reads the black "+" mark images m(3) and m(4) from the lower half of the back side of the alignment pattern and generates image data $D_{in}2$ (step C62).

Then, the image processor 21 combines image data $D_{in}1$ and $D_{in}2$ (step C63). For example, the image processor 21 combines the image data $D_{in}1$ pertaining to the mark images m(1) and m(2) and the image data $D_{in}2$ pertaining to the mark images m(3) and m(4) on image memory 13 according to the size data of the reference chart 10 corresponding to the preset alignment pattern P1.

The size data of the alignment pattern P1 is read from RAM 26 when the image data is combined. The alignment pattern P1 after combination of the image data is expressed by the alignment pattern P1($u$), the alignment pattern P1($d$), and an offset. The image data $D_{in}$ is expressed by a set of $D_{in}1$, $D_{in}2$, and offset. This enables reconstruction of the size of the reference chart 10 such as the A3-Wide size on image memory 13. Further, the size is converted to the size of the original reference chart 10 and used to calculate the displacement.

The image data $D_{in}$ of each side of the alignment pattern P1 is used to make the CPU 25 recognize the displacement of images on both sides of the alignment pattern P1. In this way, the Page Alignment mode is executed according to the image data $D_{in}1$ and $D_{in}2$ of the image marks m(1) to m(4) that are read in twice from the front side of the alignment pattern P1. (See, e.g., FIG. 6.)

Next, the controller detects positions of the mark images m(1) to m(4) according to the image data $D_{in}$ obtained from those on the back side of the sheet (step C7). For example, the controller calculates a distance B between one end (common edge) of the back side of the alignment pattern P1 and the printout position of the mark image m(2). The result of this calculation (the numeric data of distance B) is temporarily stored in RAM 26 or the like.

Then, the controller calculates a positional difference on both sides of the alignment pattern P1 (step C8). The CPU 25 reads numeric data related to displacement A and numeric data related to displacement B from RAM 26, calculates a difference between them (displacement A–displacement B), and detects the displacement ϵ between the printout position of the mark images on the front side of the alignment pattern P1 and the printout position of the mark images on the back side of the alignment pattern P1.

Then, the CPU calculates a adjustment value to correct the displacement between the printout position of the mark images on the front side of the alignment pattern P1 and the printout position of the mark images on the back side of the alignment pattern P1 from the detected displacement ϵ (step C9). The adjustment value is calculated from the size of the reference chart 10 and a coefficient α for the size of the paper P. When the reference chart size is equal to the paper size, the coefficient α is "1." When the reference chart size is greater than the paper size and images are to be magnified, the coefficient α is smaller than "1" because the displacement ϵ is also magnified and detected. This adjustment value is used to reduce the magnified images to their original sizes and to eliminate the positional displacement.

Next, the controller stores the calculated adjustment values in the storage unit 12 or the like (step C10). In the normal Double-Side Copy code, this adjustment value is read from the storage unit 12 and used as an offset value to match the image forming positions on both sides of the reference chart 10.

When the Double-Side Copy code is selected, CPU 25 controls the image former 70 to execute the normal double-side image formation (step C11). In this Double-Side Copy code, the user operates the operating section 14 to select a paper feed tray 30A or 30B in the paper feeder 23 and set image forming conditions. The setting data such as image forming conditions and tray selection information is output as operation data D3 to the CPU 25. The display 18 displays the operation data (such as image forming conditions and tray selection information) set by the operating section 14. The operation data is converted into display data D2 by the CPU 25 before being output to the display 18.

After the operation data is set, the image former 70 forms (prints) images according to the image data $D_{in}$ obtained by the image reader 11. Next, the CPU 25 judges the end of image processing (step C12). To continue part of image processing, the user enters a new operation mode. To exit the image processing, the controller ends when detecting the power-off information.

In accordance with an embodiment of this invention, when images are formed on both sides of a paper sheet P, the image reader 11 having a given image readable area I is controlled to read mark images from each side of the alignment pattern P1, specifically first mark images m(1) and m(2) and then mark images m(3) and m(4) through the image readable area I.

Even when the paper to be printed on is greater than the image readable area of the image reader 11, the image forming positions can be automatically matched on both sides of the alignment pattern P1 relative to a paper edge which is common to both sides of the alignment pattern P1. Therefore, when the image forming positions are not equal on both sides of a reference chart 10 of any size in the Double-Side Copy mode, embodiments of this invention can match the image forming positions on both sides of paper without any user help (e.g., manual detection and input of a adjustment value).

Figure 10:
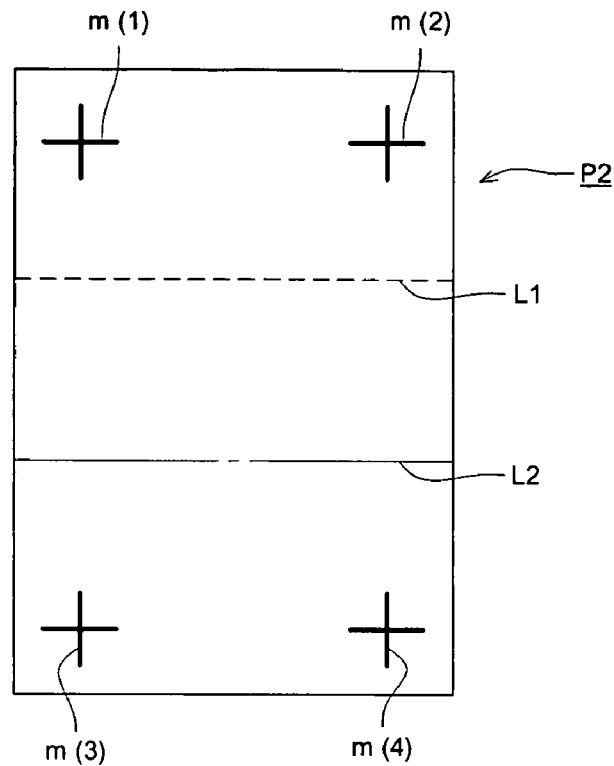
FIG. 10A and FIG. 10B are show an example of a alignment pattern P2 consistent with another embodiment of the present invention.
Figure 10:
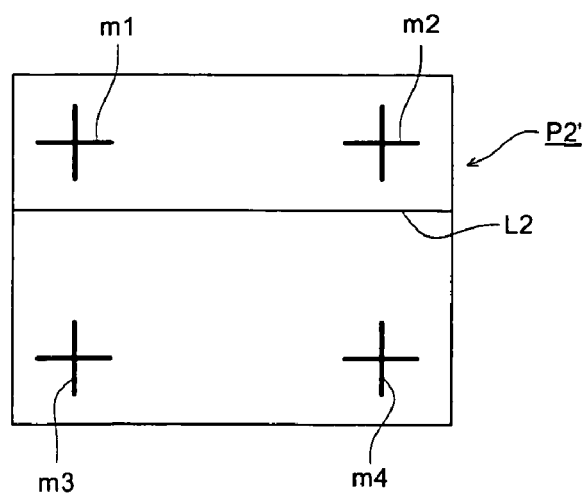

FIG. 10(A) and FIG. 10(B) show an example of a alignment pattern P2 consistent with another embodiment of this invention. The alignment pattern P2 of FIG. 10A has cross-shaped mark images m(1) to m(4) formed (e.g., printed) on a paper sheet P (e.g. of the A3-Wide size) which is greater than the image readable area I (the maximum scan size). The mark images m(1) to m(4) are formed on the corners of each side of the paper. In this example, the alignment pattern P2 of FIG. 10(A) is folded to make the image data smaller as shown in FIG. 10(B) because the image reader 11 having the maximum scan size cannot detect edges of the A3-Wide size alignment pattern P2 placed on its image readable area.

A dotted line and a chain line are drawn to guide folding on the alignment pattern sheet P2 of FIG. 10(A). For this purpose, a valley-fold line L1 and a mountain-fold line L2 are written in advance on the reference chart 10. The alignment pattern P2 is folded an even number of times along these lines. In this example (FIG. 10(A)), a valley-fold line L1 and a mountain-fold line L2 are written on the alignment pattern P2 to three-fold the paper.

The user folds the alignment pattern sheet P2 along the valley-fold line L1 and the mountain-fold line L2. Finally, the A3-Wide alignment pattern sheet P2 is folded into a smaller alignment pattern sheet P2' whose image area to be read is reduced as shown in FIG. 10(B). In this case, the folded alignment pattern P2 is approximately as big as the A4 size and the mark images m(1) to m(4) can be detected just by reading each side of the paper once.

Figure 11:
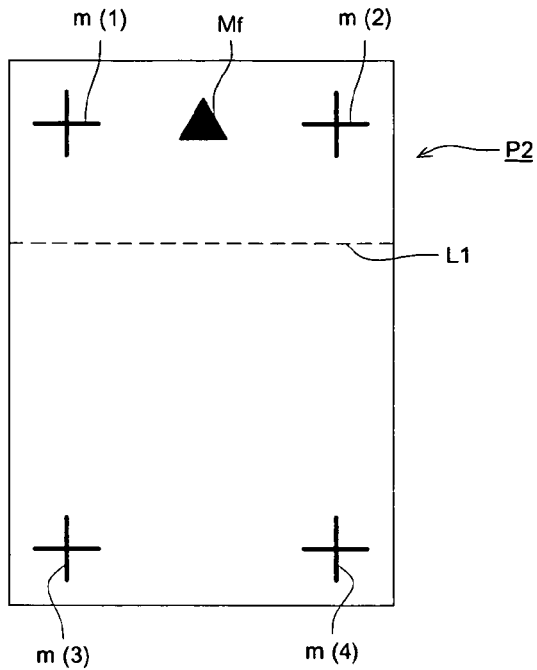
FIG. 11A FIG. 11D respectively show examples of marks Mf and Mb to judge paper sides consistent with an embodiment of the present invention.
Figure 11:
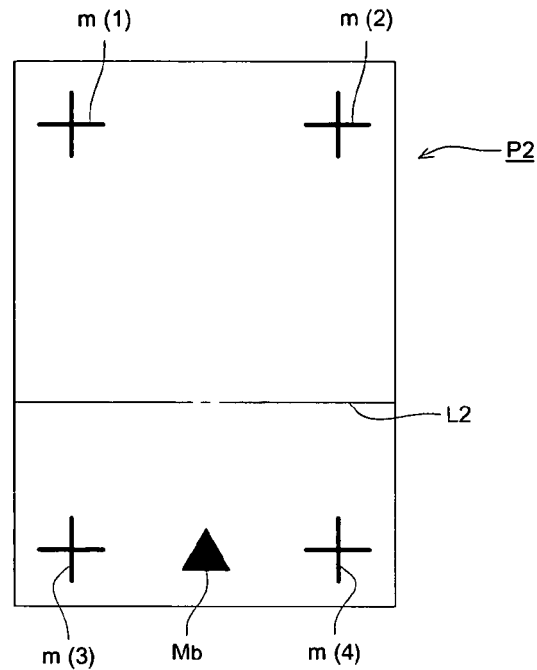
Figure 11:
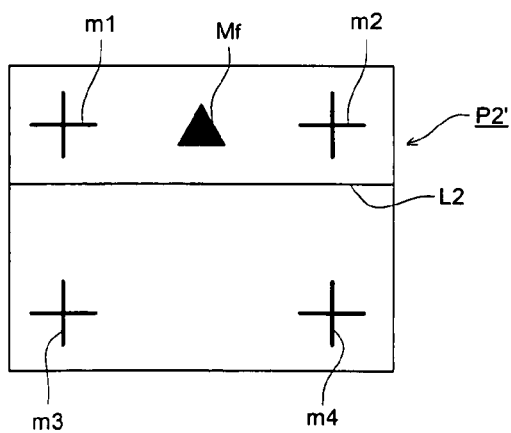
Figure 11:
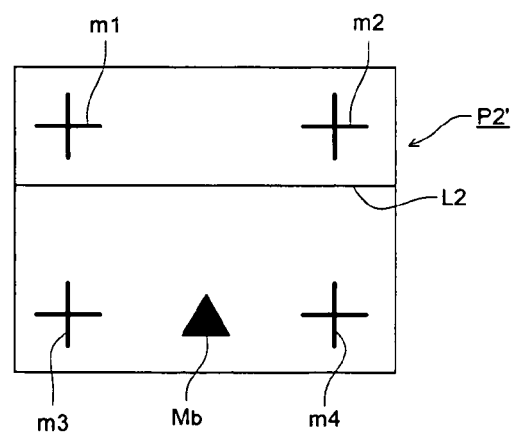

FIG. 11(A) and FIG. 11(B) respectively show examples of marks to judge a paper side. In this example, the CPU 25 controls the image former 70 to form (e.g., print) any other mark image Mf (for paper side recognition) than the mark images m(1) to m(4) on at least one side of the alignment pattern sheet P2.

A mark image Mf of FIG. 11(A) for paper side recognition is formed on the front side of the alignment pattern P2 together with the mark images m(1) to m(4). The mark image Mf, which is a black triangular mark in this example, is placed between mark images m(1) and m(2) on the top side of the reference chart 102. To print out this mark image Mf, it is provided in advance between mark images m1 and m2 on the top side of the reference chart 10 of FIG. 3.

A mark image MB of FIG. 11(B) for back side recognition is formed on the back side of the alignment pattern P2 together with the mark images m(1) to m(4). The mark image Mb, which is a black triangular mark in this example, is placed between mark images m(3) and m(4) on the bottom side of the reference chart 102. To print out this mark image Mb, it is provided in advance between mark images m3 and m4 on the bottom side of the reference chart 10 of FIG. 3.

The user folds the alignment pattern sheet P2 along the valley-fold line L1 and the mountain-fold line L2 of FIG. 11(A) and FIG. 11(B). Finally, the A3-Wide alignment pattern sheet P2 is folded into a smaller alignment pattern sheet P2' whose image area to be read is reduced as shown in FIG. 11(C). In this case, the folded alignment pattern P2' of the A3-Wide size or the like becomes a alignment pattern sheet P2' whose image area to be read is reduced.

When the alignment pattern P1 is arranged in this way, the user can easily recognize the front side, back side, top side, and bottom side of the alignment pattern sheet P2. for example, if the user places a alignment pattern sheet P2 in a wrong direction on the platen glass 51, the image processor 21 (software) can detect the wrong position or side of the alignment pattern sheet by the location and orientation of the mark image Mf.

Figure 12:
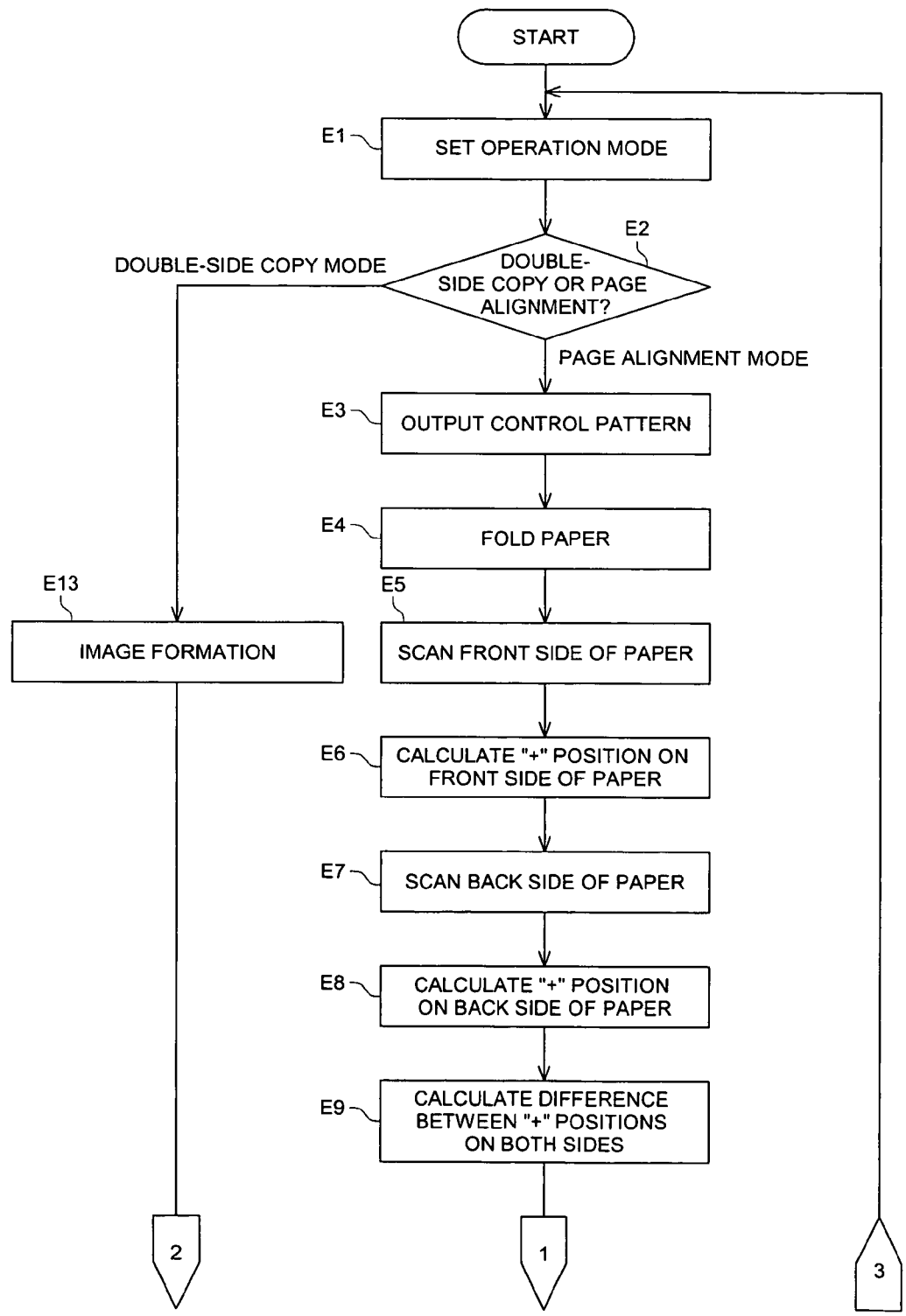
FIG. 12 shows an example of image processing when the copying machine 100 handles the alignment pattern P2 consistent with an embodiment of the present invention.
Figure 13:
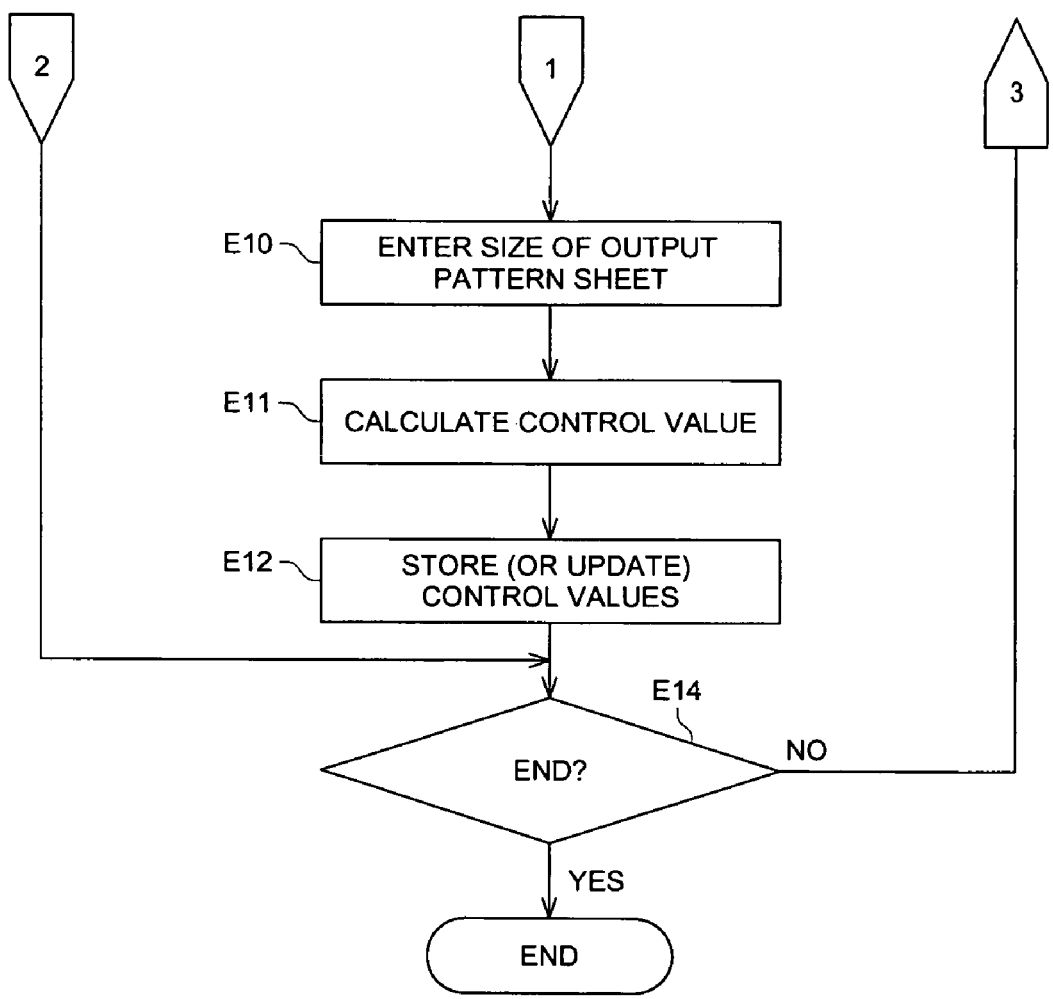
FIG. 13 shows another example of image processing flow when the copying machine 100 handles the alignment pattern P2 consistent with an embodiment of the present invention.

Next will be explained another example of image processing performed by the copying machine 100. FIG. 12 and FIG. 13 respectively show operation flows of image processing examples when the copying machine 100 handles the alignment pattern P2.

One embodiment corrects image forming positions on both sides of paper in the Page Alignment mode. This embodiment handles a alignment pattern sheet P2 (e.g. A3-Wide size or the like) which is greater in size than the maximum scan size of the image reading system. The alignment pattern P2 is folded in advance to reduce the image area to be read. The mark images on each side of the folded and reduced alignment pattern P2 are read by the image reader 11. Also in this example, the paper edge common to both sides of the paper is used as the reference position. Further, this example has two selectable modes: Normal Double-Side Copy and Page Alignment.

When the power switch of the copying machine is turned on, the CPU 25 inputs an operation mode (step E1)). From the operating section 14, the user enters the size of the paper on which a alignment pattern P2 is printed. The CPU 25 receives operation data D3 from the operating section 14 and stores data such as the size of the alignment pattern P2 in RAM 26 or the like.

When a Page Alignment mode is selected, the CPU 25 controls the image reader 11 and the image former 70 to output a alignment pattern. (step E3) In this example, four mark images m(1) to m(4) are printed on each side of the A3-Wide paper P. This printed paper P is used as a alignment-pattern sheet P2. This alignment pattern sheet P2 is ejected from the image former 70.

Then, the user folds the alignment pattern sheet P2 and puts it in place on the platen glass of the image reader 11 (step E4). For example, the user folds the alignment pattern sheet P2 along the valley-fold line L1 and the mountain-fold line L2 as shown in FIG. 10(A). Finally, the A3-Wide alignment pattern sheet P2 is folded into a smaller alignment pattern sheet P2' whose image area to be read is reduced as shown in FIG. 10(B). In this case, the folded alignment pattern P2' is approximately as big as the A4 size and the mark images m(1) to m(4) can be detected just by reading each side of the paper once.

Then, the image reader 11 reads black "+" mark images m(1) to m(4) from the front side of the folded alignment pattern sheet P2 (step E5). In this case, the user places, on the back of the alignment pattern sheet P2, an auxiliary member which is greater in size than the sheet P2 and has a contrast (density difference) to the alignment pattern having the mark images m(1) to m(4) when scanning the pattern sheet by the image reading system. Naturally, the auxiliary member is not always required. The alignment pattern P2 can be scanned with the back side of the paper P2 uncovered. With this, the edges of the alignment pattern sheet P2 become clearer and the positional displacement ε of images on both sides of the sheet P1 can be detected at a higher precision.

Then, the controller detects positions of the mark images m(1) to m(4) according to the image data $D_{in}$ corresponding to the mark images m(1) to m(4) (step E6). For example, the controller calculates a distance A between one end (common edge) of the front side of the folded alignment pattern P2 and the printout position of the mark image m(1). The result of this calculation (i.e., the numeric data of distance A) is temporarily stored in RAM 26 or the like.

Then, the image reader 11 reads the black "+" mark images m(1) to m(4) from the back side of the alignment pattern sheet P2 (step E7). In this case, the above explained auxiliary member is placed on the back of the alignment pattern sheet P2 having the mark images m(1) to m(4) on it also when reading the back side of the pattern sheet P2.

The controller then detects positions of the mark images m(1) to m(4) according to the image data Din read from the back side of the alignment pattern (step E8). For example, the controller calculates a distance B between one end (common edge) of the back side of the alignment pattern P2 and the printout position of the mark image m(2). The result of calculation (the numeric data of distance B) is temporarily stored in RAM 26 or the like.

Then, the controller calculates a positional difference on both sides of the alignment pattern P2 (step E9). The CPU 25 reads numeric data related to displacement A and numeric data related to displacement B from RAM 26, calculates a difference between them (displacement A−displacement B), and detects the displacement ε between the printout position of the mark images on the front side of the alignment pattern P2 and the printout position of the mark images on the back side of the alignment pattern P2.

Then, the user enters the size of the alignment pattern P2. For example, the CPU 25 reads data related to the size of the alignment pattern P2 and so on from RAM 26 (step E10). Next, the CPU calculates a adjustment value to correct the displacement between the printout position of the mark images on the front side of the alignment pattern P2 and the printout position of the mark images on the back side of the alignment pattern P2 from the detected displacement ε (step E11). The adjustment value is converted to a displacement ε' of the A3-Wide size paper P by calculation of the displacement ε obtained from the folded alignment pattern P2 and a coefficient β. As the size of the folded alignment pattern sheet P2 is apparently different from the size of the A3-Wide paper P (that is, the difference is in the scanning area), this coefficient β is used to get a correct adjustment value when the alignment pattern P1 is expanded to the original A3-Wide paper size.

Then, the controller stores the result of the calculation (i.e., the adjustment value) in the storage unit 12 and the like (step E12). In the normal Double-Side Copy mode, this adjustment value is read from the storage unit 12 and used as an offset value to match image forming positions on both sides of the paper P.

When the Double-Side Copy mode is set, the CPU 25 controls the image former 70 to execute the normal double-side image formation. Then, the CPU 25 judges the end of image processing (step E14). To continue part of image processing, the user returns enters another operation mode. To exit the image processing, the controller ends when detecting the power-off information.

In accordance with an embodiment of this invention, when the alignment pattern sheet P2 having positioning mark images m(1) to m(4) is greater in size than the maximum scan size of the image reading system, the alignment pattern sheet P2 is folded to reduce the image area to be read and the mark images m(1) to m(4) are read from both sides of the folded alignment pattern sheet P2.

Therefore, the controller can detect a displacement ε between the printout position of the mark image m(1) on the front side of the alignment pattern sheet P2 and the printout position of the mark image m(2) on the back side of the alignment pattern sheet P2 according to the read-out image data $D_{in}$ corresponding to the mark images m(1) to m(4); When image printout positions are not equal on both sides of paper in the Double-Side Copy mode, this displacement ε can be automatically detected by the Page Alignment mode even when the paper (A3-wide size) is greater than the normal A3 size paper. Therefore, this invention can easily match the image forming positions on both sides of paper in the manner similar to the first embodiment without any user help (manual detection and input of a adjustment value).

Figure 14:
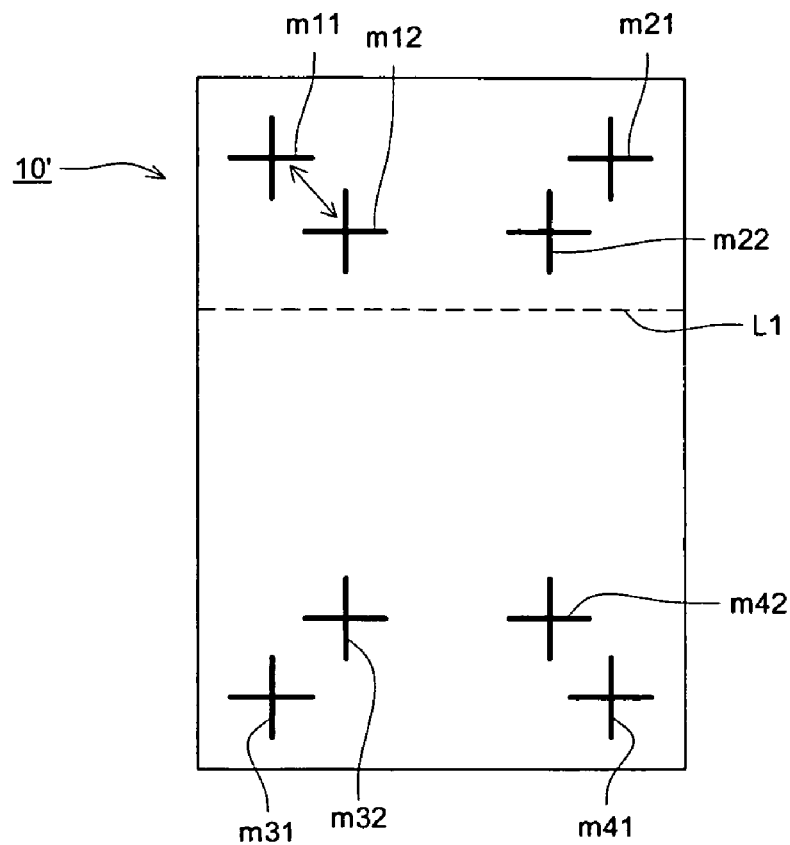
FIG. 14 shows an example of a reference chart 10' consistent with still another embodiment of the present invention.

FIG. 14 is a conceptual drawing showing an example of a reference chart 10' which is related to a yet another embodiment of this invention. The reference chart 10' of FIG. 14 has primary cross-shaped mark images m11 to m41 formed (e.g., printed) on the corners of one side of a paper sheet and secondary mark images m12 to m42 formed near the primary mark images at a preset distance between them.

For example, the mark image m12 is located to the lower right of the mark image m11 at a preset distance between them. The mark image m22 is located to the lower left of the mark image m21 at a preset distance between them. The mark image m32 is located to the upper right of the mark image m31 at a preset distance between them. The mark image m42 is located to the upper left of the mark image m41 at a preset distance between them.

The image data for the reference chart 10' may be provided separately and stored in the storage unit 12. Naturally, the image data is not limited to the above. The image processor 21 can hold it as digital image data corresponding to the reference chart 10'. In this case, when the Page Alignment mode is selected, the CPU 25 can read image data for a reference chart from the image processor 21, send it to the image former 70, and cause the image former 70 to form the primary cross-shaped mark images m(11) to m(41) on the corners of each side of the paper P and the secondary mark images m(12) to m(42) respectively near the primary cross-shaped mark images. This reference chart 10' (having primary and secondary image marks on both sides of the paper) is used as a alignment pattern P2.

In this example, when reading the primary mark images m11 to m41 and the secondary mark images m12 to m42 on each side of the control patter sheet P2, the image processor 21 measures the distance between each set of adjacent primary and secondary mark images. For example, the image processor 21 measures the distance between image marks m11 and m12, distance between image marks m21 and m22, distance between image marks m31 and m32, and distance between image marks m41 and m42.

In accordance with another embodiment of this invention, image positions on both sides of a reference chart 10 can be corrected using a reference chart 10' which has primary cross-shaped mark images m11 to m41 formed (e.g., printed) on four corners of one side of a paper sheet P and secondary mark images m12 to m42 formed near the primary mark images at a preset distance between them.

Therefore, this method can get a difference in distance which is a difference between a mark-to-mark distance before print-out and a mark-to-mark distance after print-out. This difference in distance is a partial magnification error of the image reader 11 (the image reading system). It is possible to eliminate the partial magnification error by correcting the displacement ε to eliminate this difference in distance. Further it is possible to match image positions on both sides of paper at a higher precision by detecting and correcting "differences in magnification between longitudinal and transversal directions," "differences in timing between longitudinal and transversal directions," "tilting and skewing," etc. according to the displacement ε on both sides of the reference chart 10' obtained by this measurement.

Figure 15:
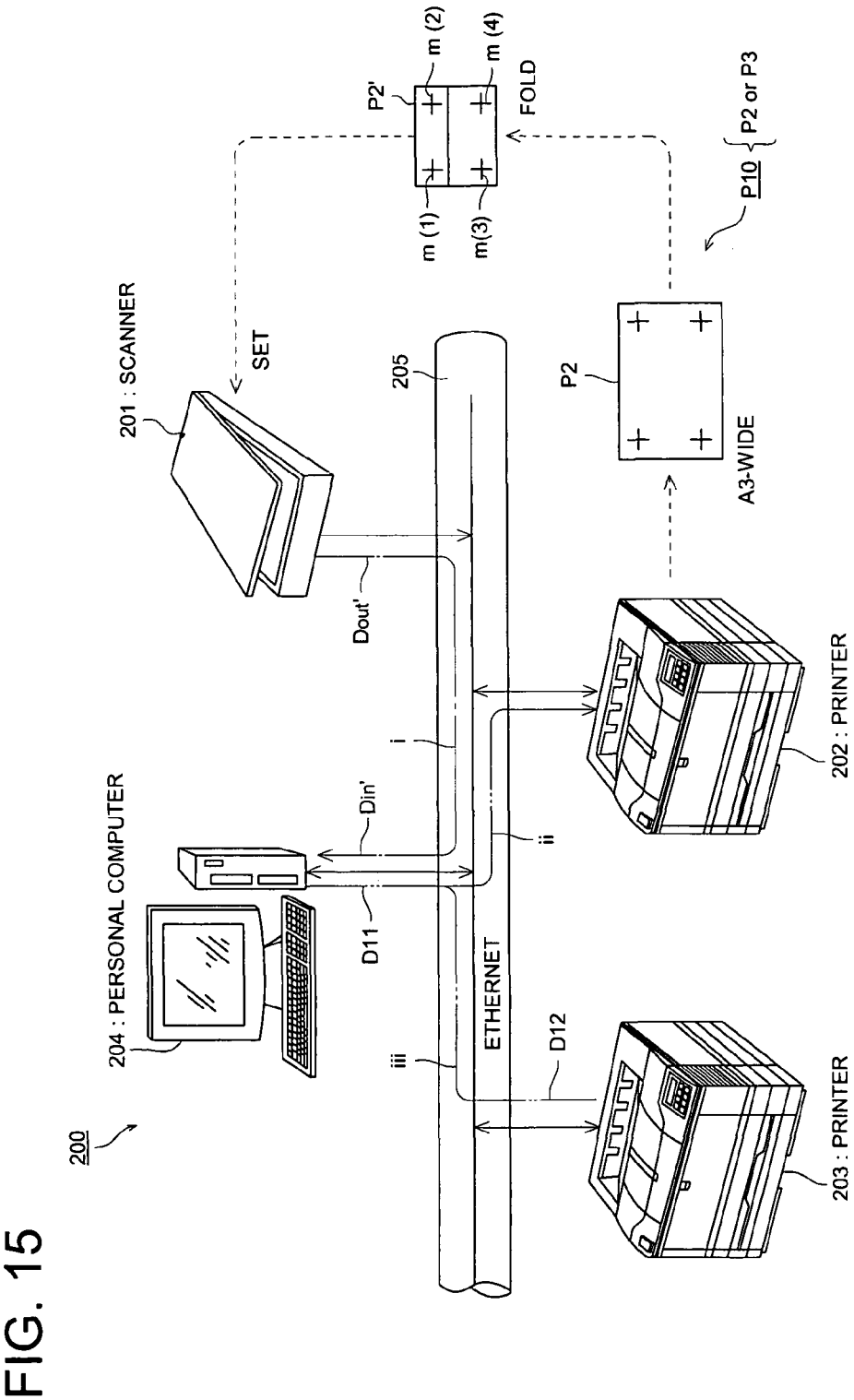
FIG. 15 shows an example of an image forming system 200 consistent with yet another embodiment of the present invention.

FIG. 15 shows an example of an image forming system 200 consistent with still another embodiment of this invention.

The image forming system 200 is a system that can form images on both sides of paper sheets and adjust image forming positions on both sides of paper sheets using printers 202 and 203 which are connected to a network such as Ethernet (®) 205 by using a scanner 201 and a personal computer (hereinafter abbreviated as PC) 204.

The scanner 201 connected to Ethernet (®) 205 reads mark images for positioning from a reference chart 10 and output image data $D_{out}$. The scanner 201 can also read mark images from both sides of a alignment pattern P2' which is prepared by folding a alignment pattern sheet P2 (having the mark images on it) and smaller than a paper sheet on which images are actually formed (printed).

When reading mark images from both sides of a alignment pattern sheet P2' in this example of system configuration, the scanner 201 places, on the back of the sheet P2', an auxiliary member which is greater in size than the sheet P2' and has a contrast (e.g., a density difference) to the mark images on both sides of the sheet P2'. Naturally, the auxiliary member is not always required. The scanner can read the above mark images with the back side of the alignment pattern sheet P2' uncovered. With this, the edges of the alignment pattern sheet P2' become clearer and the positional displacement of images on both sides of the sheet P2' can be detected at a higher precision.

When reading the mark images on both sides of the alignment pattern sheet P2', the scanner 201 is controlled to scan the mark image areas slower than the non-mark image areas (e.g., to make the images magnified). This enables detection of image displacements at a high precision.

Each of the printers 202 and 203 is connected to Ethernet (®) 205 receives image data Din corresponding to mark images on the reference chart 10, forms (e.g., prints) mark images on a paper sheet (not shown in the drawing) according to the image data $D_{in}$, and outputs the printed sheet as a alignment pattern sheet P2. Each of the printers 202 and 203 is controlled to print cross-shaped mark images on four corners of each side of the paper. These mark images are used to correct the image forming positions on each side of a paper sheet on the printer (202 or 203).

When the alignment pattern sheet P2 having mark images for positioning is greater in size than the maximum scan size of the scanner, for example, A3-Wide size (which is greater than A3 size), the sheet P2 is folded to reduce the image area to be read and the scanner 201 reads mark images on both sides of the folded alignment pattern sheet P2'. The alignment pattern sheet P2' is folded by an even number of times. (See, e.g., FIG. 10(A).)

The PC 204 is an example of an information processor. The PC is connected to Ethernet (®) 205 and calculates a adjustment value to eliminate a difference in distance which is a difference between a mark-to-mark distance before print-out and a mark-to-mark distance after print-out from a displacement $\epsilon$ detected by the scanner 201. For example, the PC 204 inputs image data $D_{in}$ corresponding to mark images read by the scanner 201 and calculates a difference between distance A and distance B (where distance A is a distance from one edge on the front side of the alignment pattern sheet P2' to a printout position of a mark image and distance B is a distance from the other edge on the back side of the alignment pattern sheet P2' to a printout position of a mark image according to the image data Din. (See, e.g., FIG. 5(A) and FIG. 5(B).) Further, the PC 204 detects a displacement between the mark positions on both sides of the alignment pattern sheet P2' and controls the printers 202 and 203 to match the image forming positions on both sides of the alignment pattern sheet P2'.

Furthermore, the PC 204 inputs image data $D_{in}$ corresponding to mark images read by the scanner 201 and detects a displacement $\epsilon$ between mark printout positions on both sides of the alignment pattern P2'. The PC 204 converts this displacement $\epsilon$ to the size (e.g. A3-Wide size) of paper on which images are actually printed out and controls the printers 202 and 203 to match image forming positions on both sides of the paper on which images are actually printed out according to the result of conversion.

The route i of FIG. 15 is used to transfer image data $D_{in}$ corresponding to mark images m1 to m4 on the reference chart 10 to the printer 202. The route i is used to transfer image data $D_{out}$ corresponding to mark images m(1) to m(4) on the alignment pattern P2' to the PC 204. The route ii is used to transfer displacement control data D11 which is processed by the PC 204 to the printer 202. The printer 203 uses the routes i and ii similarly and the route iii to transfer displacement control data D12 from the PC 204.

The PC 204 controls the printers 202 and 203 to print images for recognition of paper sides using the mark images on at least one side of the alignment pattern sheet P2'. (See FIG. 11(A) to FIG. 11(D).)

Also in this example, the printers 202 and 203 are controlled to print primary cross-shaped mark images on four corners of one side of the alignment pattern sheet P2' and secondary mark images near the primary mark images at a preset distance between them on each side of the alignment pattern sheet P2'. The scanner 201 is controlled to measure the distance between each set of adjacent primary and secondary mark images which are printed on each side of the alignment pattern sheet P2' when reading mark images on the alignment pattern sheet P2'. With this configuration, the image forming system can get a difference in distance which is a difference between a mark-to-mark distance (a distance between adjacent primary and secondary marks) before print-out and a mark-to-mark distance after print-out and eliminate the partial magnification error in the image reading system by this difference-in-distance data. (See FIG. 14.)

Figure 16:
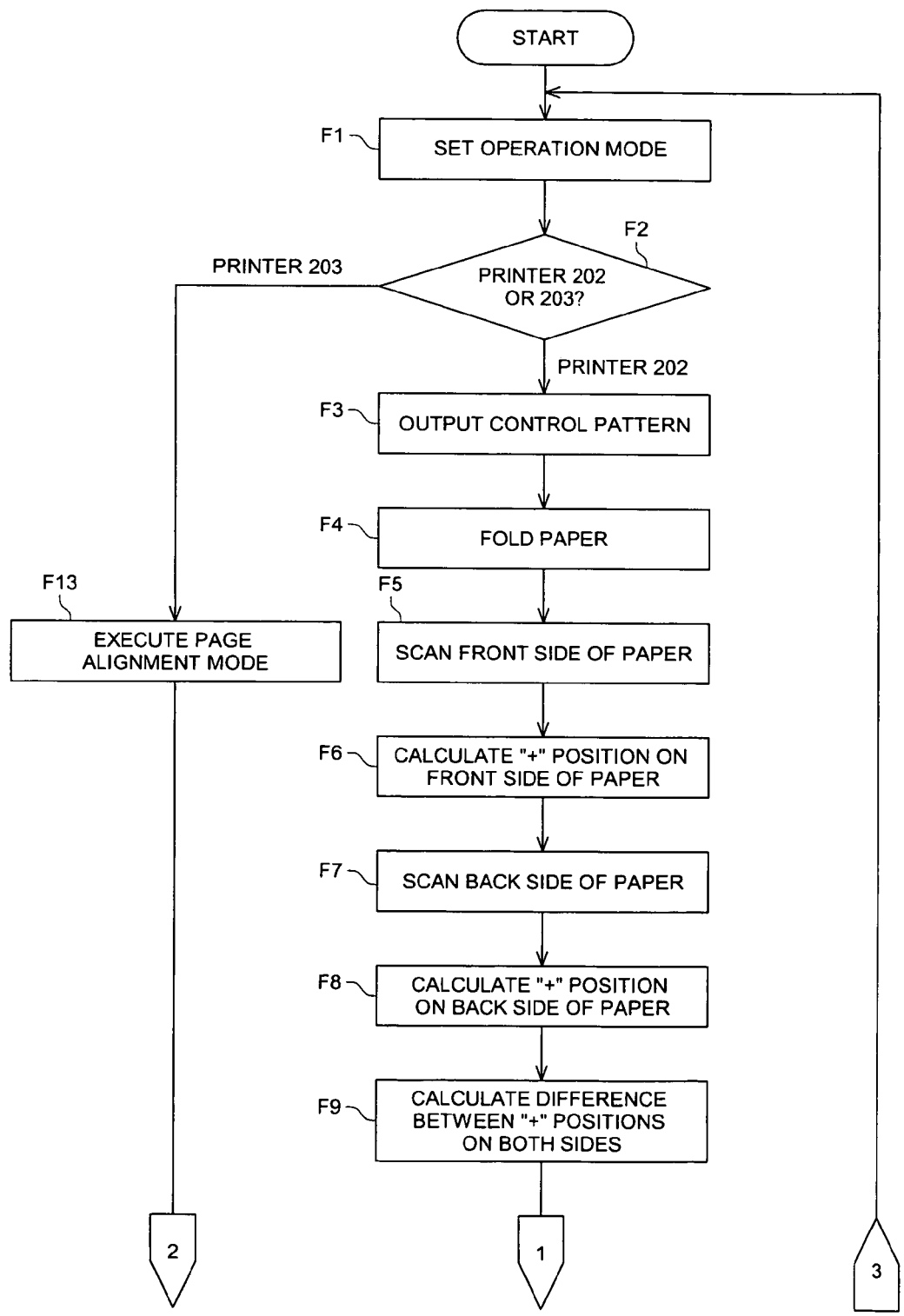
FIG. 16 shows an example of image processing when the copying machine 200 handles the alignment pattern P2 consistent with an embodiment of the present invention.
Figure 17:
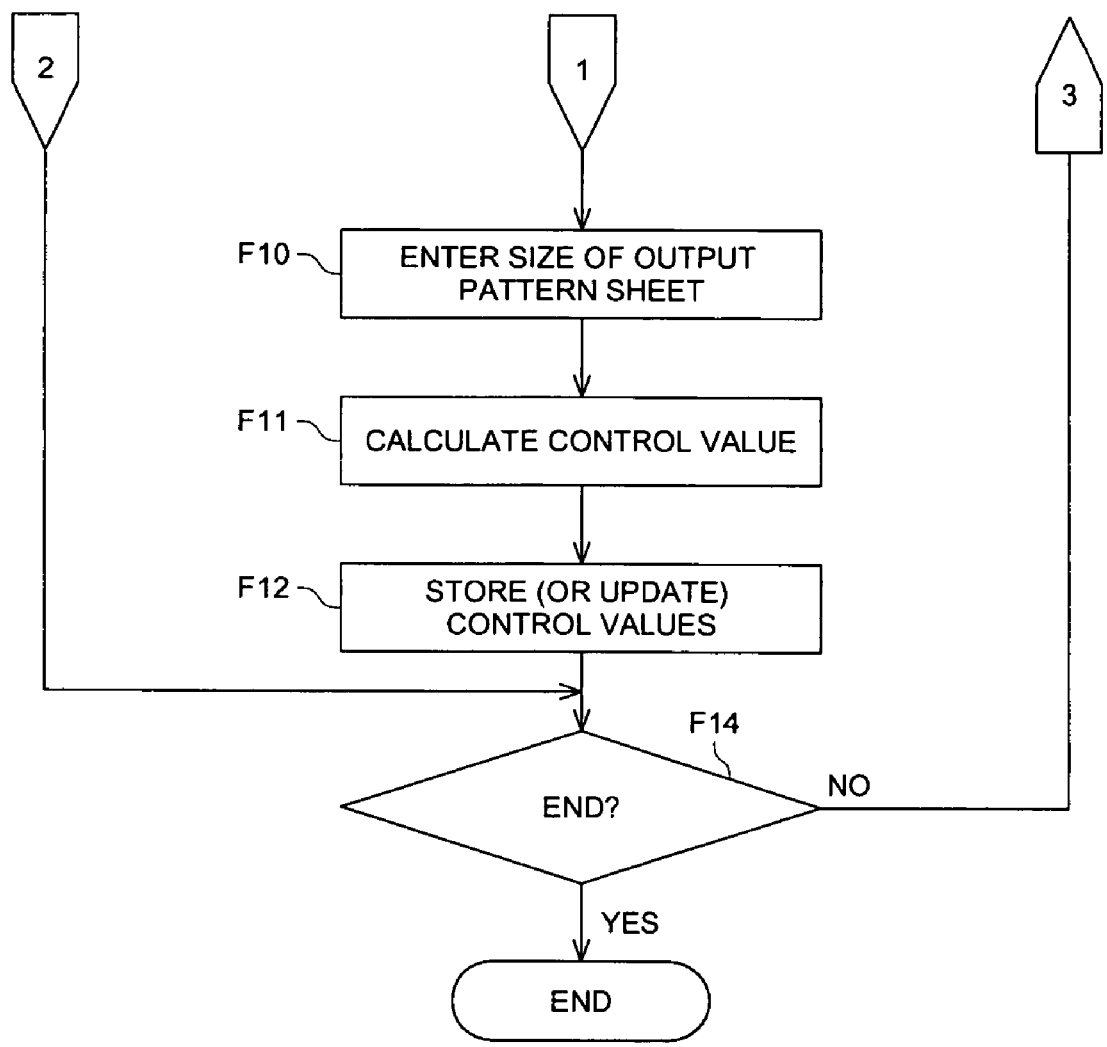
FIG. 17 shows an example of image processing when the copying machine 200 handles the alignment pattern P2 consistent with another embodiment of the present invention.

Next will be explained an example of image processing in the image forming system 200. FIG. 16 and FIG. 17 respectively show examples of image processing on the alignment pattern P2 in the image forming system 200.

This embodiment corrects the image forming positions on each side of paper in the Page Alignment mode assuming the use of printers 202 and 203 connected to Ethernet (®) 205, a scanner 201, and a PC 204. Further, this embodiment assumes that the reference chart 10 for creation of image formation on both paper sides is greater than the maximum scan size of the image reading system and that the alignment pattern P2 is of the A3-Wide size. The explanation of the normal Double Side Copy mode after implementation of the Page Alignment mode is omitted here.

After the power switches of the apparatus (e.g. printers 202 and 203, scanner 201, and PC 204) connected to Ethernet (®) 205 are turned on, the PC 204 inputs a selected operation mode (step F1). The user sets the Page Alignment mode using the keyboard and the mouse of the PC 204.

Then, the user enters the size of a reference chart sheet 10 to create a alignment pattern P2 on each printer (202 and 203). The PC 204 receives operation data D3 from the keyboard and the mouse and stores paper size data of the alignment pattern P2 from the operation data D3. Next, the user sets which printer 202 or 203 first starts the Page Alignment mode. This example starts the printer 202 first to execute the Page Alignment mode.

To execute the Page Alignment mode first on the printer 202, the PC 204 controls the printer 202 to output a alignment pattern. In this case, image data $D_{in}$ of mark images m1 to m4 for creation of a reference chart is read from the storage unit 12 or the like in the printer 202 and set in the image former 70 through the image processor 21 (step F3). In this example, the printer 202 prints out mark images m(1) to m(4) on each side of the A3-Wide size reference chart sheet 10. This reference chart sheet 10 is used as a alignment pattern P2'. This alignment pattern sheet P2' is ejected from the printer 202. The user folds the alignment pattern sheet P2, and sets it on the scanner 201 (step F4).

For example, the user folds the alignment pattern sheet P2 along valley- and mountain-fold lines. The folded A3-Wide alignment pattern sheet P2 becomes a alignment pattern sheet P2' having the image area reduced. (See FIG. 10(A) and FIG. 10(B).) By reducing the image area of the alignment pattern sheet P2, it is possible to get a alignment pattern sheet P2' of approximate A4 size and detect mark images m(1) to m(4) on each side by a single scanning.

Next, the scanner 201 reads black "+" mark images m(1) to m(4) from the folded alignment pattern sheet P2' (step F5). When reading mark images, the user places, on the back of the sheet P2', an auxiliary member which is greater in size than the sheet P2' and has a contrast (e.g., a density difference) with the alignment pattern P2'.

Naturally, the auxiliary member is not always required. The alignment pattern P2' can be scanned with the back side of the paper P2' uncovered. With this, the edges of the alignment pattern sheet P2' become clearer and the positional displacement $\epsilon$ of images on both sides of the sheet P2' can be detected at a higher precision. The image data $D_{out}$ of mark images m(1) and m(4) read from the alignment pattern P2' is transferred from the scanner 201 to the PC 204 along the route i of FIG. 15.

Next, the PC 204 detects the positions of the mark images m(1) to m(4) from the image data $D_{in}$ corresponding to the read-out mark images and calculates, for example, a distance A which is a distance between one end (common edge) of the front side of the alignment pattern P2' and the printout position of the mark image m(1) (step F6). The result of this calculation (e.g., the numeric data of distance A) is temporarily stored in the PC 204.

Then, the scanner reads black "+" mark images m(1) to m(4) from the back side of the folded alignment pattern sheet P2' (step F7). Also when reading the mark images, the user places the auxiliary member on the back of the sheet P2' on which the mark images m(1) to m(4) are printed.

Then, the PC 204 detects the positions of the mark images m(1) to m(4) from the image data Din corresponding to the read-out mark images and calculates, for example, a distance A which is a distance between one end (common edge) of the front side of the alignment pattern P2' and the printout position of the mark image m(2) (step F8). The result of this calculation (e.g., the numeric data of distance B) is temporarily stored in the PC 204.

Then, the PC 204 calculates a difference between both sides of the alignment pattern sheet P2' (step F9). In this case, the PC 204 reads numeric data of distances A and B, subtracts the numeric data of distance B from the numeric data of distance B, and detects the displacement $\epsilon$ between mark printout positions on both sides of the alignment pattern sheet P2'.

Then, the PC 204 inputs the size of the alignment pattern sheet P2' (step F10). For example, the PC 204 reads out the data of size of the alignment pattern sheet P2 from memory and calculates a adjustment value to eliminate a positional difference between the image forming positions on both sides of the alignment pattern sheet P2' (step F11).

The adjustment value converts the displacement $\epsilon$ obtained from the folded alignment pattern sheet P2' and a coefficient $\beta$ into a displacement $\epsilon'$ on the A3-Wide reference chart 10. As the size of the folded alignment pattern sheet P2' is apparently different from the size of the A3-Wide reference chart 10 (that is, the difference is in the scanning area), this coefficient $\beta$ is used to get a correct adjustment value when the alignment pattern P2' is expanded to the original A3-Wide reference chart 10.

Then, the PC 204 sends the result of calculation (e.g., adjustment values) to the printer 202 and stores it there (step F12). For example, the position control data D11 processed by the PC 204 is transferred from the PC 204 to the printer 202 via the route ii of FIG. 15. In the normal Double-Side Copy mode, the adjustment values are read out from memory of the printer 202 and used as offset values to match image forming positions on both sides of the reference chart 10.

Then, the PC 204 judges whether to end the Page Alignment mode (step F14). To continue this mode, the PC 204 returns to step F2 and judges which printer 202 or 203 executes the Page Alignment mode next. In this example, when the printer 202 has completed the Page Alignment mode, the PC 204 causes the printer 203 to execute the Page Alignment mode (step F13). To exit the image processing, the PC 204 ends controlling when detecting the power-off information and the like.

As described above, in accordance with the image forming system and method consistent with an embodiment of this invention, when images are printed on both sides of a selected reference chart 10 by printers 202 and 203 which as connected to an Ethernet (registered trademark) 205, their printout positions are controlled using the scanner 201 and the PC 204.

Therefore, when the image forming positions are shifted from each other on both sides of the reference chart 10, the page image forming positions can be easily matched without any manual measurement and input of a shift value by the user. Even when the alignment pattern sheet P2' having the mark images on it is greater in size than the image readable area of the scanner 201, the paper is folded to make the image area to be read smaller and the image reader 11 reads the mark images on both sides of the folded alignment pattern sheet P2'.

Therefore, even when the alignment pattern sheet P2' is greater than the A3 size (e.g. A3-Wide size), image forming positions can be automatically matched on both sides of the alignment pattern sheet P2'. When this invention is applied to a color copying machine, the user first measures a displacement of black (BK) images and applies this displacement, as a reference, to measurement of displacements of images in other colors (yellow, magenta, cyan, and black).

In accordance with embodiments of this invention, even when an image is formed on a paper sheet which is greater in size than the image readable area of the scanner, the image forming positions on both sides of the paper can be automatically matched relative to the common reference positions (by paper edges, etc.) on both sides. Therefore, when the image forming positions in Double Side Copy mode are shifted from each other on both sides of the paper, the page image forming positions can be easily matched without any manual measurement or manual input of a shift value by the user.

The foregoing has described principles, preferred embodiments and modes of operation of the invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the invention as defined by the following claims and equivalents thereof.

What is claimed is:

1. A method of correcting image forming positions on both sides of a wide paper sheet with a wide size which is greater in size than a maximum image reading size of an image reading system, comprising the steps of, setting image data to form a plurality of reference images on one side of the wide paper sheet, forming a plurality of reference images for positioning on at least an upper end portion and a lower end portion on each of obverse and reverse sides of a first wide paper sheet with the wide size based on the image data and an image forming reference position, folding a middle portion of the first wide paper sheet to make the first wide paper sheet smaller than the image reading area so as to maintain the plurality of reference images on the obverse side of the folded first wide paper sheet and the plurality of reference images on the reverse side of the folded first wide paper sheet, reading the plurality of reference images on the obverse side of the folded first wide paper sheet so as to obtain small-sized obverse side image data through the image readable area of the image reading system reading the plurality of reference images one the reverse side of the folded first wide paper sheet so as to obtain small-sized reverse side image data, obtaining positions of the plurality of reference images on the obverse side of the first wide paper sheet with the wide size based on the small-sized obverse side image data, obtains positions of the plurality of reference images on the reverse side of the first wide paper sheet with the wide size based on the small-sized reverse side image data, obtaining an amount of misalignment between the positions of the plurality of reference images on the obverse side of the first wide paper sheet and the positions of the plurality of reference images on the reverse side of the first wide paper sheet, and adjusting an image forming position on an obverse side of a second wide paper sheet with the wide size relative to an image forming position on a reverse side of the second wide paper sheet according to the obtained amount of misalignment.

2. The method described in claim 1, wherein image data are transmitted through a network among the step of setting, the step of forming, the step of reading, the step of obtaining, and the step of adjusting.

3. The method described in claim 1, wherein in the step of setting, cross-shaped reference images are set on four corners of each side of the first wide paper sheet as the plurality of positioning reference images, wherein in the step obtaining, a difference between a distance from the image forming reference position to the reference images on the obverse side of the first wide paper sheet and a distance from the image forming reference position to the reference images on the reverse side of the first wide paper sheet are calculated, and the misalignment between the image forming position on the obverse side of the first wide paper sheet and the image forming position on the reverse side of the first wide paper sheet is calculated based on the difference, and wherein in the adjusting step, the image forming position on the obverse side of the second paper is adjusted relative to the image forming position on the reverse side of the second paper according to the quantity of misalignment.

4. The method described in claim 1, wherein in the step of reading the reference images, an auxiliary member which is greater in size than the folded first wide paper sheet and has a contrast with the reference images on both sides of the folded first wide paper sheet is placed on the back of the folded first wide paper sheet to be read.

5. The method described in claim 1, wherein in the step of reading reference images on both sides of the folded first wide paper sheet, the back side of the folded first wide paper sheet is uncovered.

6. The method described in claim 1, wherein in the step reading the reference images formed on both sides of the folded first wide paper sheet, the reference image area is read at a lower speed than non-reference image areas.

7. The method described in claim 1, wherein the first wide paper sheet is folded by an even number of times.

8. The method described in claim 1, wherein in the step of forming, images are formed for paper side recognition other than the reference images on at least one side of the first wide paper sheet.

9. The method described in claim 1, wherein in the step of forming reference images on both sides of the first wide paper sheet, primary reference images and secondary reference images are formed on each side of the first wide paper sheet such that the secondary reference images are near the primary reference images at a preset interval between them, and in the step of reading reference images from both sides of the first wide paper sheet, the distance between adjacent primary and secondary reference images formed on both sides of the first wide paper sheet is measured.

10. The method described in claim 1, wherein in the step of forming, a valley-fold line and a mountain-fold line are formed on one side of the first wide paper sheet.

11. The method described in claim 1, wherein in the step of obtaining, an adjustment value to correct the misalignment between the printout position of the reference images on the obverse side of the first paper and the printout position of the reference images on the reverse side of the first wide paper sheet is calculated.

* * * * *